United States Patent
Shin et al.

(10) Patent No.: US 12,487,026 B2
(45) Date of Patent: Dec. 2, 2025

(54) REFRIGERATOR WITH INTERACTIVE INFORMATION AND LIGHTING EFFECTS AND METHOD FOR CONTROLLING SAME

(71) Applicant: LG ELECTRONICS INC., Seoul (KR)

(72) Inventors: Yongchul Shin, Seoul (KR); Yoon Ha, Seoul (KR); Minhyeok Kim, Seoul (KR); Joohee Son, Seoul (KR); Jipyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 440 days.

(21) Appl. No.: 17/986,577

(22) Filed: Nov. 14, 2022

(65) Prior Publication Data

US 2023/0400249 A1 Dec. 14, 2023

(30) Foreign Application Priority Data

Jun. 13, 2022 (WO) ................ PCT/KR2022/008295

(51) Int. Cl.
*F25D 29/00* (2006.01)
*F21V 8/00* (2006.01)
*F25D 23/02* (2006.01)
*F25D 27/00* (2006.01)
*G06T 7/70* (2017.01)
(Continued)

(52) U.S. Cl.
CPC ......... *F25D 27/005* (2013.01); *F25D 23/028* (2013.01); *G02B 6/0073* (2013.01); *G06T 7/70* (2017.01); *G06V 20/68* (2022.01); *G06V 40/16* (2022.01); *H04N 7/188* (2013.01);
(Continued)

(58) Field of Classification Search
CPC .... F25D 23/028; F25D 27/005; F25D 29/005; F25D 2400/361; F25D 2327/001
See application file for complete search history.

(56) References Cited

U.S. PATENT DOCUMENTS

2009/0103587 A1* 4/2009 Cooper .................... G01K 1/14
374/45
2016/0232877 A1* 8/2016 Cho ........................ F25D 29/00
(Continued)

FOREIGN PATENT DOCUMENTS

JP 3-45878 A 2/1991
JP 2018-197628 A 12/2018
(Continued)

OTHER PUBLICATIONS

JP 2018-197628 (English Translation) (Year: 2018).*

*Primary Examiner* — Jonathan Bradford
(74) *Attorney, Agent, or Firm* — Birch, Stewart, Kolasch & Birch, LLP

(57) ABSTRACT

A refrigerator can include a cabinet for defining a space; a first display door for opening and closing the space, the first display door including a display panel configured to output content; a second door for opening and closing the space; and a controller configured to control the display panel of the first display door and the light sources in the second door. Also, the second door includes a front plate; a light guide plate configured to guide light to the front plate; and light sources configured to irradiate light to the light guide plate and when the light sources are turned on, the front plate is configured to emit light in a first color.

21 Claims, 31 Drawing Sheets

(a)

(b)

(51) Int. Cl.
  *G06V 20/68* (2022.01)
  *G06V 40/16* (2022.01)
  *H04N 7/18* (2006.01)
(52) U.S. Cl.
  CPC .. *F25D 2327/001* (2013.01); *F25D 2400/361* (2013.01); *F25D 2700/06* (2013.01)

(56) References Cited

U.S. PATENT DOCUMENTS

| | | | | |
|---|---|---|---|---|
| 2018/0189027 | A1* | 7/2018 | Jeon | ........................ F25D 23/02 |
| 2018/0335252 | A1* | 11/2018 | Oh | ........................ F25D 23/028 |
| 2019/0249485 | A1 | 8/2019 | Jeong et al. | |
| 2020/0327601 | A1* | 10/2020 | Kim | ..................... G06Q 10/087 |
| 2021/0270519 | A1 | 9/2021 | Yoon | |

FOREIGN PATENT DOCUMENTS

| | | |
|---|---|---|
| JP | 2022-1808 A | 1/2022 |
| KR | 10-2011-0037303 A | 4/2011 |
| KR | 10-2014-0088325 A | 7/2014 |
| KR | 10-2015-0095042 A | 8/2015 |
| KR | 10-1713333 B1 | 3/2017 |
| KR | 10-2018-0025046 A | 3/2018 |
| KR | 10-2024595 B1 | 9/2019 |
| KR | 10-2214126 B1 | 2/2021 |
| WO | WO 2022/225377 A1 | 10/2022 |

\* cited by examiner

FIG. 5
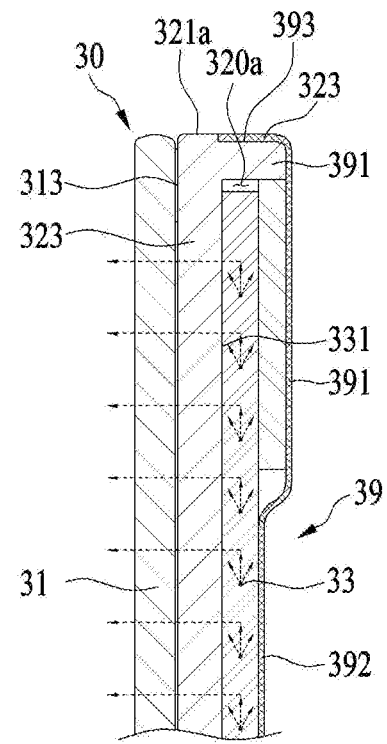
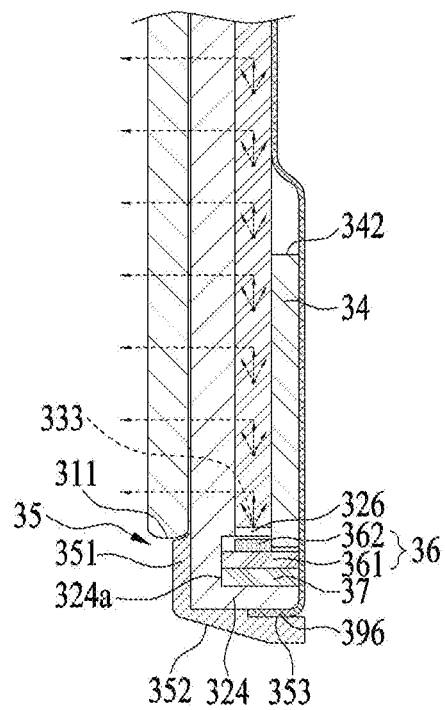

FIG. 14
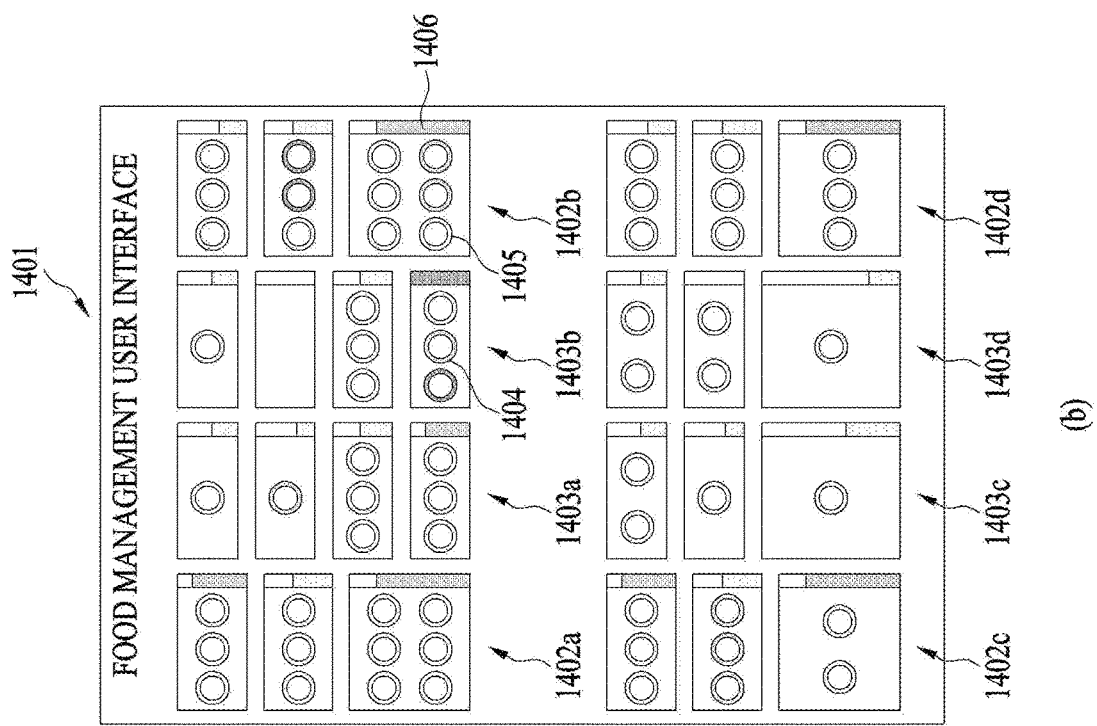
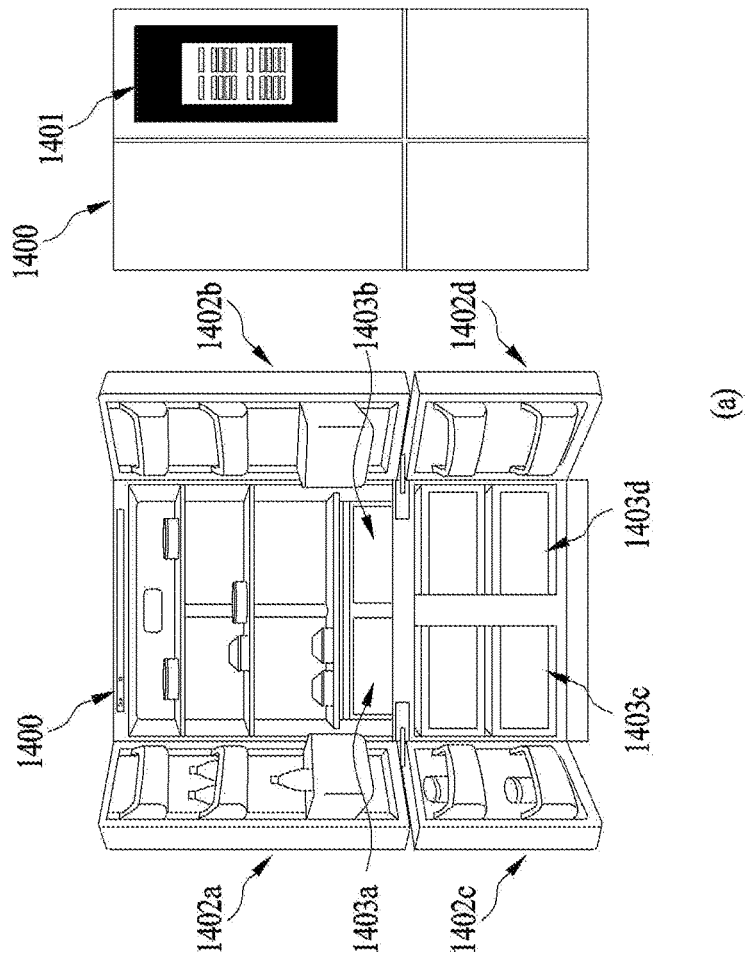

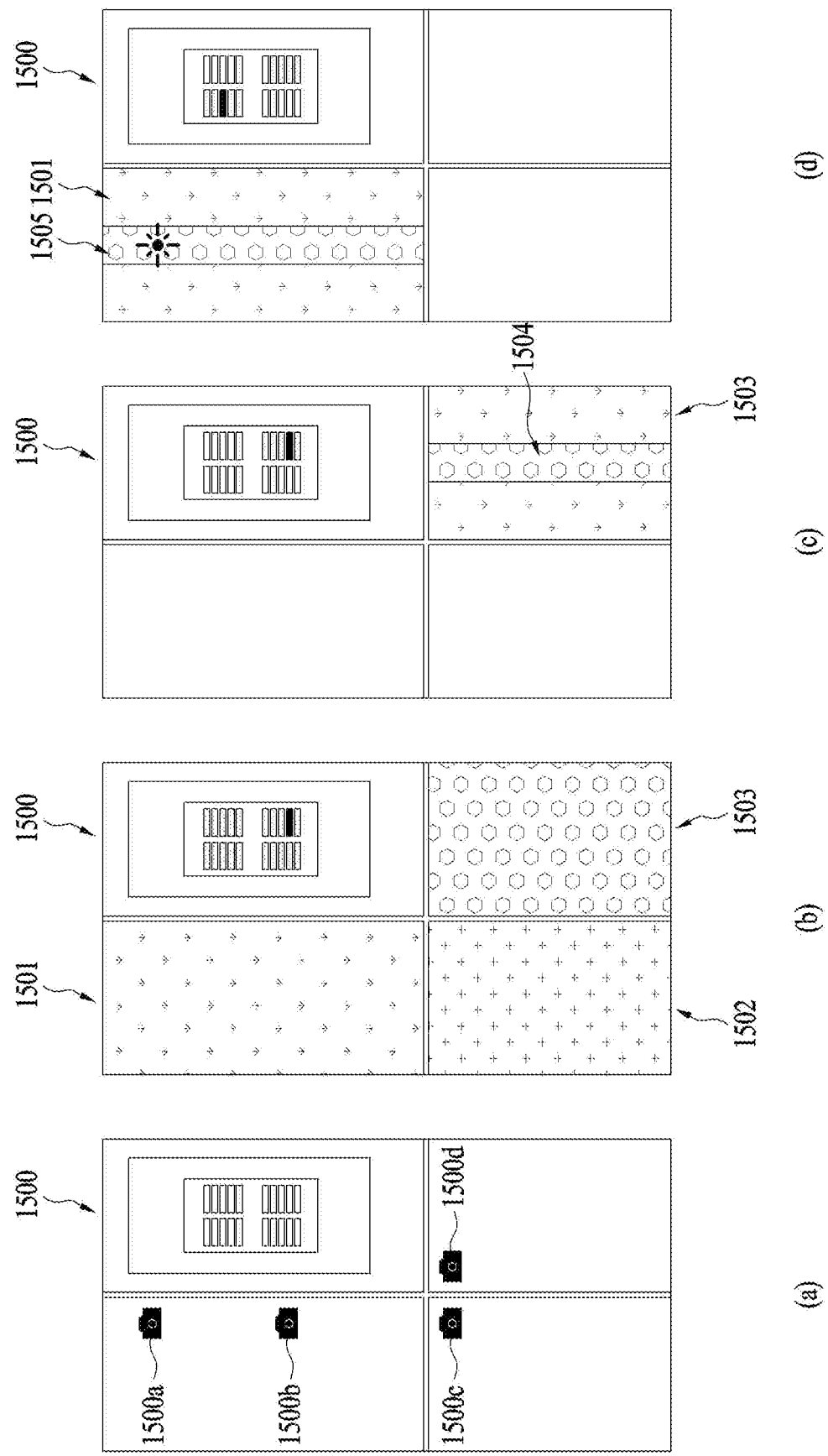

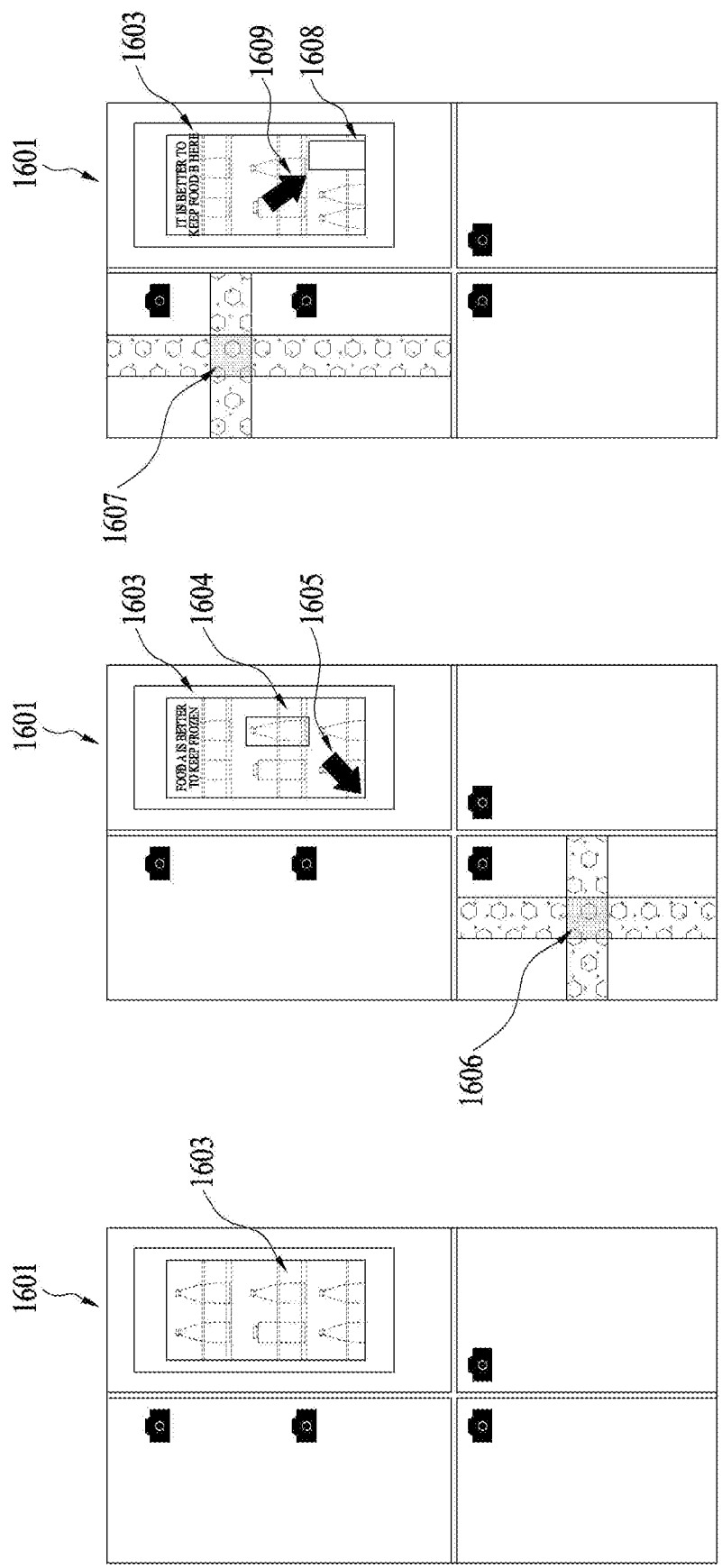

FIG. 19a
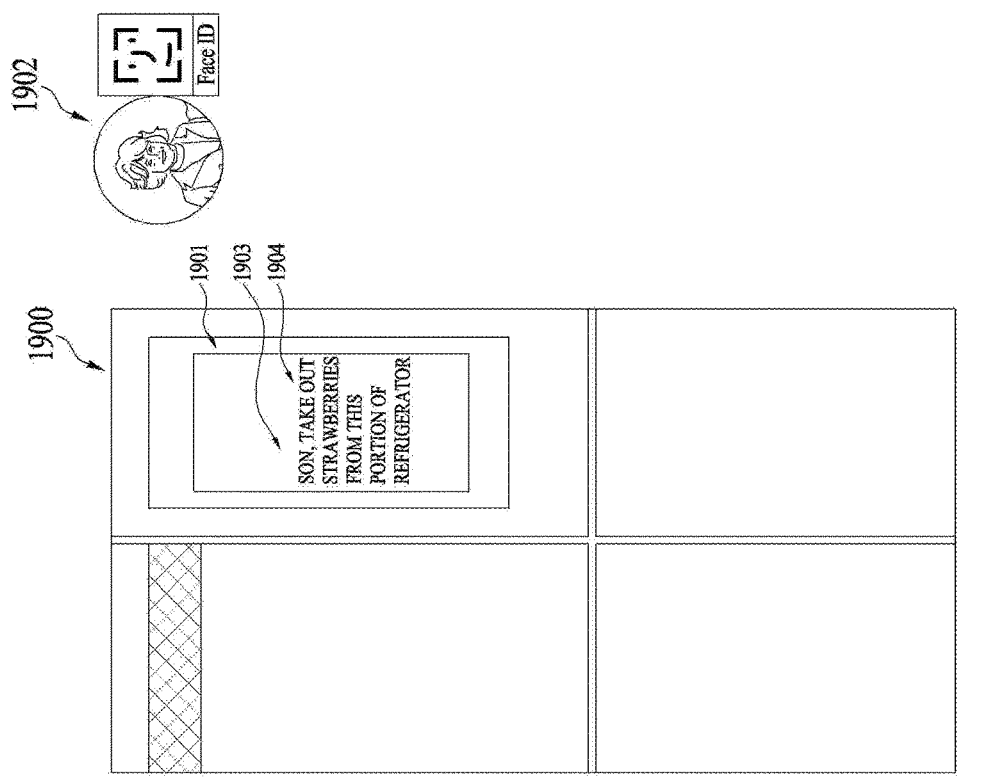
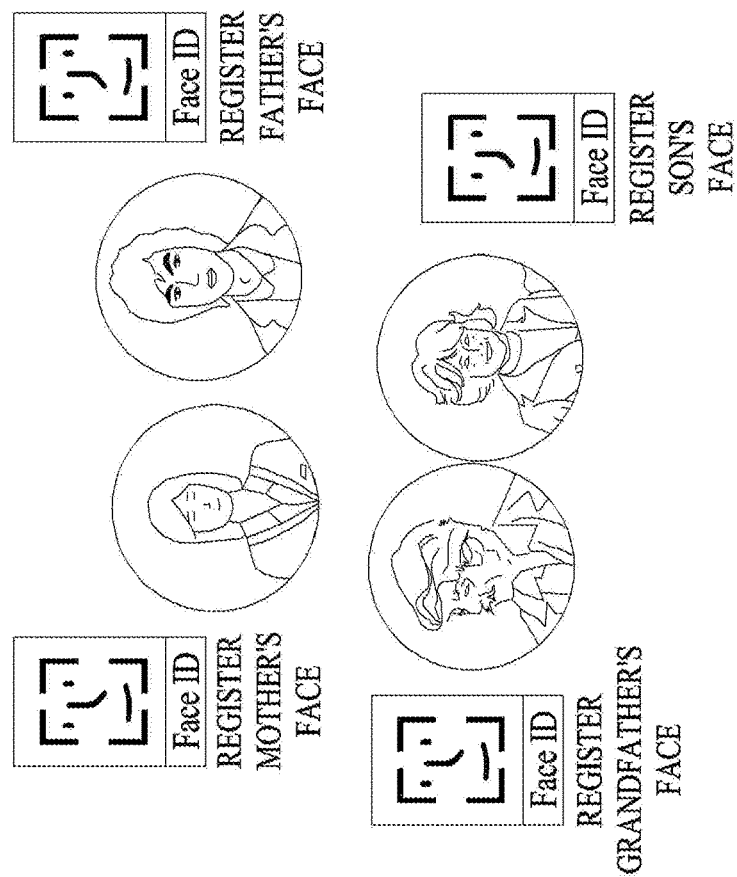

REFRIGERATOR WITH INTERACTIVE INFORMATION AND LIGHTING EFFECTS AND METHOD FOR CONTROLLING SAME

CROSS-REFERENCE TO RELATED APPLICATION

This application claims priority to International PCT Application No. PCT/KR2022/008295, filed in the Republic of Korea on Jun. 13, 2022, the entirety of which is hereby incorporated by reference as if fully set forth herein.

BACKGROUND

Field

The present disclosure relates to a refrigerator and a method for controlling a refrigerator.

Discussion of the Related Art

In general, a refrigerator is a home appliance that allows food to be stored at a low temperature in an internal storage space that is shielded by a refrigerator door. The refrigerator may store the stored food in an optimal state by cooling an interior of the storage space using cold air generated via a heat exchange with a refrigerant circulating in a refrigeration cycle.

Such refrigerator is gradually becoming larger and more multifunctional in accordance with a change in a dietary habit and a trend of a luxury product, and a refrigerator having various structures and equipped with convenience devices in consideration of a user convenience is being released.

Technologies for varying an outer appearance of a refrigerator door front surface are being developed for harmony with an environment in which the refrigerator is placed or with surrounding furniture or home appliances, and such trend is taking place throughout the general home appliance.

U.S. Pat. No. 8,789,900 (hereinafter, referred to as "Prior Document 1") discloses a structure in which a decor panel forming an outer appearance is mounted on the door front surface of the refrigerator. The decor panel is constructed to be detachable, thereby forming an outer appearance of the door front surface based on a user's preference.

However, in the refrigerator of Prior Document 1, when the user wants to change the outer appearance, an entirety of the decor panel must be removed and replaced, and the decor panel before the replacement is not able to be used any longer.

In order to solve such problem, Chinese Patent No. 103250018 (hereinafter, referred to as "Prior Document 2") discloses a refrigerator in which a reflective layer and a transparent panel are arranged on the door front surface of the refrigerator, and a light emitting member having a color is mounted on each of both ends of the reflective layer such that the transparent panel may emit light with a set color.

However, in the case of Prior Document 2, a technology for operating the light emitting member or controlling the operation of the light emitting member in the refrigerator is not disclosed.

SUMMARY OF THE DISCLOSURE

The present disclosure is directed to providing a refrigerator and a method for controlling the refrigerator in which a color of a door can be changed in order to solve one or more of the above problems.

One embodiment of the present disclosure provides a refrigerator including a cabinet for defining at least one space therein, a display door for opening and closing the space, in which the display door has a display panel for outputting content, each of a first door, a second, and a third door for opening and closing the space and having light sources, and a controller that controls the display panel and the light sources, in which each of the first door, the second door, and the third door includes a front plate and a light guide plate for guiding light to the front plate, in which the light sources irradiate light to the light guide plate, and light irradiated to the light guide plate passes through the front plate, in which when the light sources are turned on, the front plate emits light in a first color.

The light sources included in at least one of the first door, the second door, and the third door are arranged in one of a lower edge-type structure, a side edge-type structure, a lower and side edge-type structure, and a direct-type structure.

The light sources are LEDs capable of exhibiting RGB colors.

The display door further includes a front camera, the controller activates the front camera when a user approaches the display door, films food recognized via the front camera, and stores information about the food in a database based on the filmed food, in which the information about the food includes a name of the food and an expiration date of the food.

At least one of the first door, the second door, and the third door includes a camera therein, and the controller films food via the camera, and stores information about the food in a database, in which the information about the food includes a name of the food and an expiration date of the food.

The controller receives information about food from a user via the display panel, and stores the information about the food in a database, in which the information about the food includes a name of the food and an expiration date of the food.

The refrigerator further includes an internal camera for filming an interior of the refrigerator, and the controller determines a location of the food via the internal camera, and stores the determined location of the food in the database together with the information about the food.

The controller outputs at least one of the expiration date of the food, the location of the food, and a storage amount of the food stored in the space on the display panel.

The controller outputs the expiration date of the food with an expiration date indicator, outputs the expiration date indicator in a second color when a period equal to or smaller than a first period is left until the expiration date of the food, and outputs the expiration date indicator in a third color when the expiration date of the food has passed.

The controller changes a color of at least one of the first door, the second door, and the third door based on the expiration date of the food.

The controller changes a color of a partial region of the first door, the second door, and the third door based on the location of the food.

The controller outputs a flickering indicator at the location of the food using a light source located in the partial region.

The refrigerator further includes communication means for communicating with a user terminal, and when receiving a request for a recommended location of first food from the user terminal, the controller changes a color of a door corresponding to the recommended location of the first food.

The controller outputs a guide indicator indicating a recommended location of second food when a location of the second food stored in the space does not match the recommended location of the second food.

The recommended location is determined based on at least one of a temperature of the space, a degree of congestion of the space, a characteristic of the first food, and freshness of the first food.

Communication means receives information from a server, and the controller updates information being output on the display panel when third food stored in the space is withdrawn, and outputs a pop-up window on the display panel when food related to the third food is not in the space, in which the pop-up window outputs the information received from the server.

The controller recognizes at least one face via the front camera, receives a name corresponding to the recognized face via the display panel, maps the recognized face to the name, and stores the mapped face and name in the database, receives a memo via the display panel, in which the memo contains a name corresponding to a first face and information about fourth food, and changes a color of a partial region of a door corresponding to a location of the fourth food when the first face is recognized via the front camera.

The refrigerator further includes at least one temperature sensor for sensing a temperature of the space, and the controller changes a color of a door corresponding to the temperature sensor when the temperature sensed by the temperature sensor is equal to or higher than a first temperature.

The controller outputs a warning screen via the display panel when the temperature sensed by the temperature sensor is equal to or higher than the first temperature.

The display panel operates in one of a transparent mode, a translucent mode, and an opaque mode under the control of the controller.

One embodiment of the present disclosure provides a method for controlling a refrigerator including a cabinet for defining at least one space therein, a display door for opening and closing the space, in which the display door has a display panel for outputting content, each of a first door, a second, and a third door for opening and closing the space and having light sources, and a controller that controls the display panel and the light sources including irradiating, by the light sources, light to a light guide plate included in each of the first door, the second door, and the third door, transmitting light irradiated to the light guide plate through a front plate included in each of the first door, the second door, and the third door, and emitting, by the front plate, light of a first color when the light sources are turned on.

According to one embodiment of the present disclosure, the location and the state of the food stored in the refrigerator can be checked at a glance and managed more easily.

In addition, according to one embodiment of the present disclosure, the optimal location of the food to be put in the refrigerator can be identified to increase the space utilization of the storage compartment inside the refrigerator.

In addition, according to one embodiment of the present disclosure, the information on the abnormal event such as the high temperature information of the food to be stored in the refrigerator can be displayed to increase the energy efficiency and manage the food more freshly.

The effects that can be obtained from the present disclosure are not limited to the effects mentioned above, and other effects not mentioned will be clearly understood by those of ordinary skill in the technical field to which the present disclosure belongs from the description below.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

FIG. 5 is a cross-sectional view taken along a line 5-5 in FIG. 4 according to an embodiment of the present disclosure.

FIG. 14, including parts (a) and (b), is a view for illustrating a food management user interface of a refrigerator according to an embodiment of the present disclosure.

FIGS. 16a and 16b are views for illustrating an embodiment of providing a recommended location of food in a refrigerator according to an embodiment of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components can be provided with the same reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are generally only used to distinguish one element from another.

It will be understood that when an element is referred to as being "connected with" another element, the element can be directly connected with the other element or intervening elements can also be present. In contrast, when an element is referred to as being "directly connected with" another element, there are no intervening elements present.

A singular representation can include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps can likewise be utilized.

Figure 1:
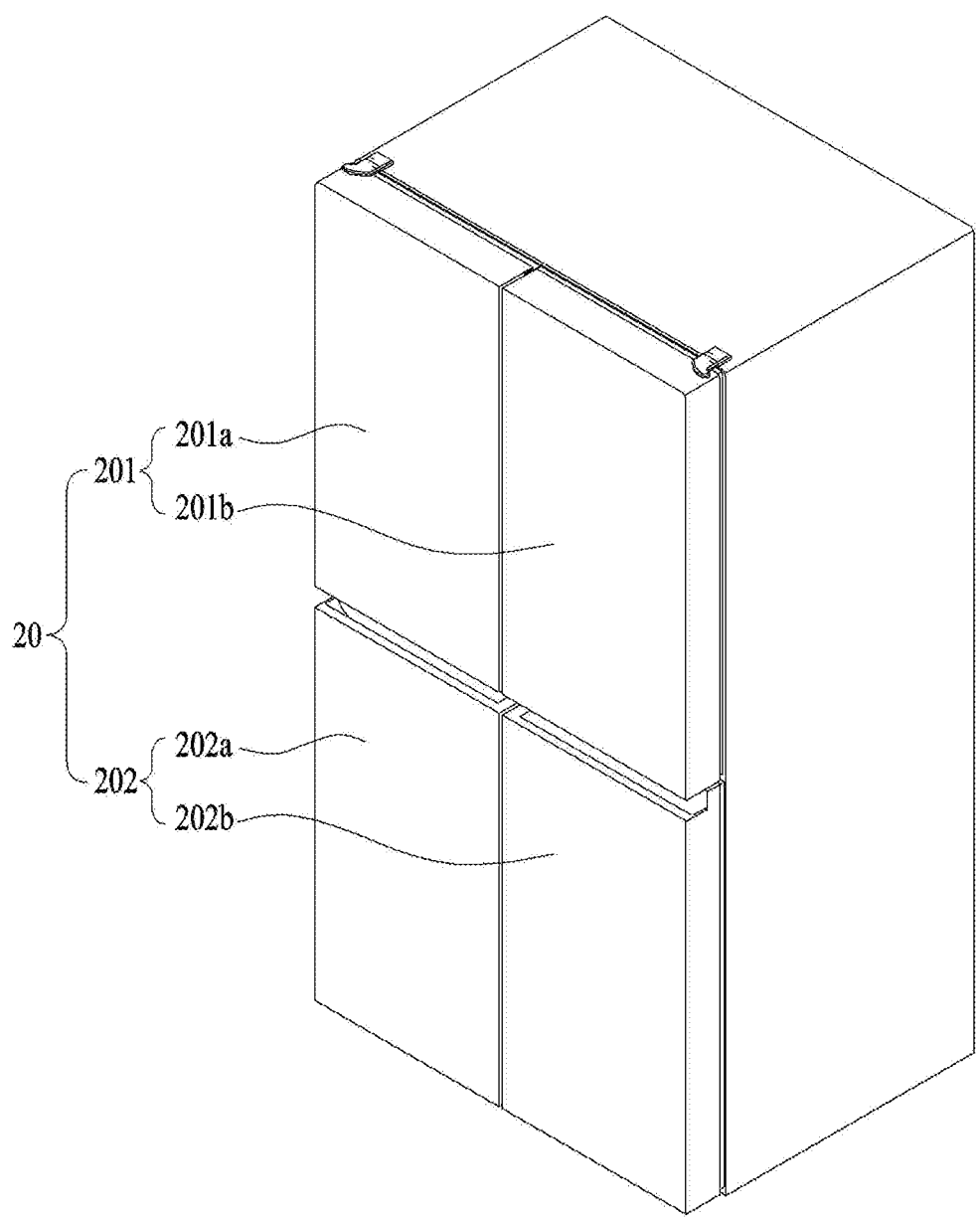
FIG. 1 is a perspective view of a refrigerator according to an embodiment of the present disclosure.
Figure 2:
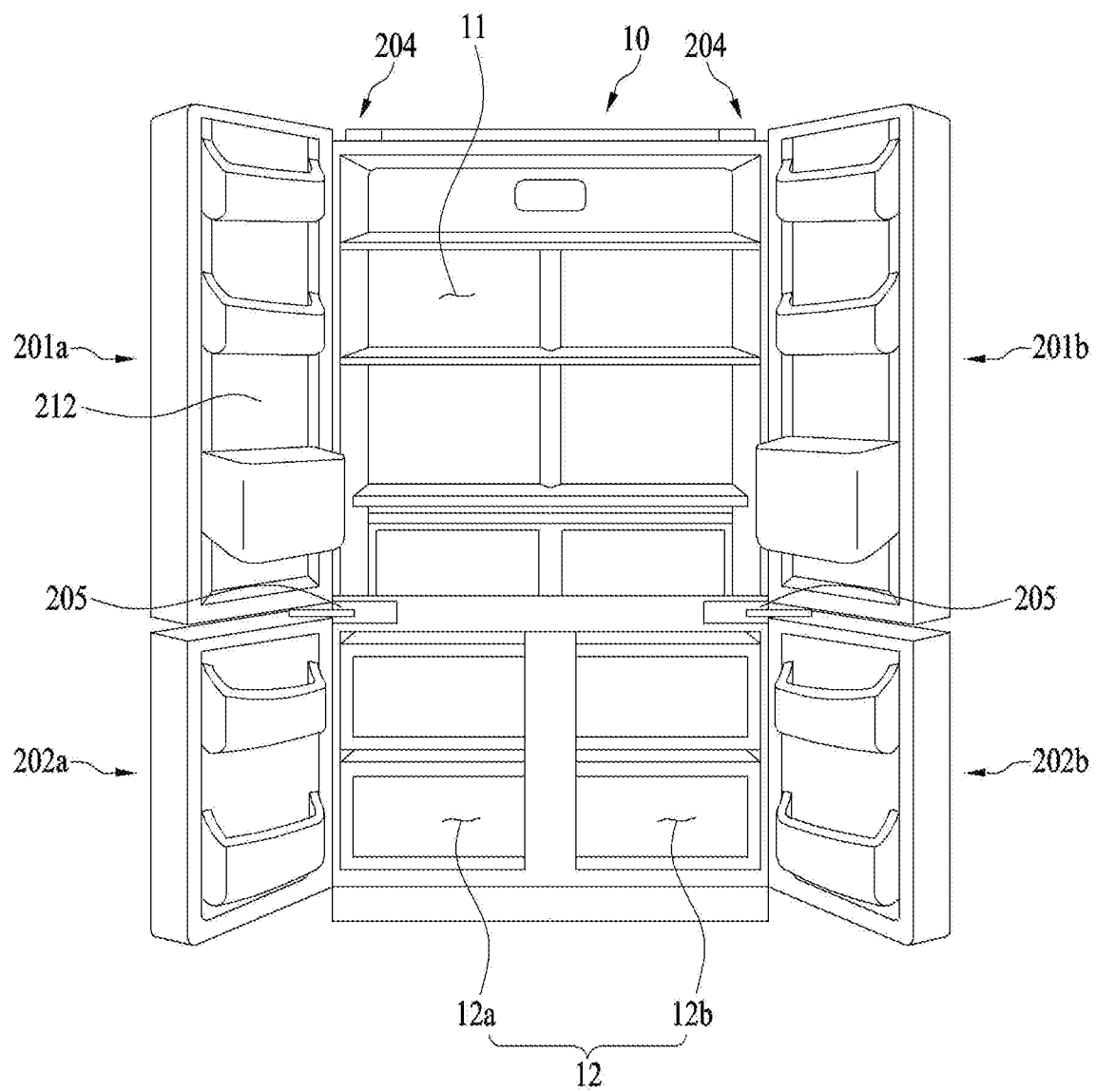
FIG. 2 is a front view with an open door of a refrigerator according to an embodiment of the present disclosure.

FIG. 1 is a perspective view of a refrigerator according to an embodiment of the present disclosure, and FIG. 2 is a front view with an open door of a refrigerator. Hereinafter, descriptions duplicate with those of the above drawings will be omitted.

Referring to FIG. 1, a refrigerator 1 according to an embodiment of the present disclosure can include a cabinet 10 for defining therein a storage space (or a storage section), and a door 20 that opens and closes the storage space of the cabinet 10.

In one embodiment, the cabinet 10 can define the storage space partitioned in a vertical direction, a refrigeration compartment can be defined at an upper portion of the storage space, and a freezer compartment can be defined at a lower portion of the storage space. The refrigeration compartment can be referred to as an upper storage space and the freezer compartment can be referred to as a lower storage space.

The door 20 can open and close each of the refrigeration compartment and the freezer compartment. In one embodiment, the door 20 can be pivotably mounted to the cabinet 10, and can open and close each of the refrigeration compartment and the freezer compartment by the pivoting. In one example, the door 20 can be constructed to open and close the refrigeration compartment and/or the freezer compartment by entry and exit.

The door 20 can include a refrigeration compartment door 201 for opening and closing the refrigeration compartment and a freezer compartment door 202 for opening and closing the freezer compartment. The refrigeration compartment door 201 can be referred to as an upper door, and the freezer compartment door 202 can be referred to as a lower door.

In the refrigeration compartment door 201, a pair of a left refrigeration compartment door and a right refrigeration compartment door can be arranged side by side. The left refrigeration compartment door and the right refrigeration compartment door can be pivoted independently of each other to open and close the refrigeration compartment. The left refrigeration compartment door and the right refrigeration compartment door can be disposed adjacent to each other and can have the same size.

In the freezer compartment door 202, a pair of a left freezer compartment door and a right freezer compartment door can also be arranged side by side. The left freezer compartment door and the right freezer compartment door can be pivoted independently of each other to open and close the freezer compartment. The left freezer compartment door and the right freezer compartment door can be disposed adjacent to each other and can have the same size.

In one example, in the present embodiment, for convenience of illustration and understanding, a refrigerator of a structure in which the refrigeration compartment is disposed above the freezer compartment is described as an example, but the present disclosure is able to be applied to any type of refrigerator equipped with a door without being limited to a shape of the refrigerator.

In one example, the door 20 can form an outer appearance of a front surface of the refrigerator 1 in a closed state, and can form an outer appearance of the refrigerator 1 viewed from the front in a state in which the refrigerator 1 is installed.

The door 20 can have a structure in which a front surface thereof can selectively emit light, and can be constructed to emit light with a set color or brightness. Accordingly, a user can allow a color or brightness of the front surface of the door 20 to be changed without removing or disassembling the door 20, and can change an overall outer appearance of the refrigerator 1.

Hereinafter, a structure of the door 20 will be described in detail with reference to the drawings.

In one embodiment of the present disclosure, a left refrigeration compartment door 201a and the freezer compartment door 202 have the entirely same structure except that locations and sizes thereof are different from each other. Such doors 201a and 202 can be referred to as panel doors or first doors.

A right refrigeration compartment door 201b can have a structure different from that of the doors 201a and 202, and can have a structure capable of seeing through a rear space, that is, a space in the refrigerator. Accordingly, the right refrigeration compartment door 201b can be referred to as a transparent door, a see-through door, or a second door. Hereinafter, the right refrigeration compartment door 201b will be mainly described.

In addition, in one embodiment, the right refrigeration compartment door 201b can be equipped with an Android-applied display. In this case, the right refrigeration compartment door 201b can correspond to both the transparent door and a display door. In this regard, the right refrigeration compartment door 201b can be referred to as the display door.

In one example, all the doors can be constructed as non-see-through doors (panel doors).

In the present embodiment, the case in which one see-through door is disposed is described as an example, but a plurality of see-through doors can be arranged. In addition, the see-through door can be disposed at a location other than the right refrigeration compartment door 201b.

The right refrigeration compartment door 201b can include a main door and a sub door. The main door can be pivotably mounted to the cabinet 10 and can open and close a refrigeration compartment 11 by the pivoting. The main door can have an opening extending through the main door. The opening can be defined to extend through a remaining portion except for a perimeter of the main door, and at least a portion of the opening can define a portion of the storage space in the refrigerator.

The main door can be equipped with the sub door. The sub door can be pivotably mounted on the main door, and can open and close the opening. In this regard, the sub door can be formed to have the same size as the main door, and an outer appearance of a front surface of the right refrigeration compartment door can be formed by the sub door when viewed from the front.

That is, the sub door can form an outer appearance of a front surface of the right refrigeration compartment door 201b, and can have the same color as the doors 201a and 202 based on an operation of a lighting device 36. The sub door can visualize an interior of the opening or the space inside the refrigerator based on manipulation of the user. To this end, a see-through region can be defined in the sub door. The see-through region can appear selectively, and when the see-through region does not appear, the sub door can emit light of the set color to form the outer appearance of the front surface of the sub door. The see-through region can be variously referred to as a visualizing portion, a see-through window, a window, and the like.

An expiration date of a stored food was able to be recognized using a camera of the refrigerator, and such information was able to be displayed via the display, but there was a problem in that it was difficult to accurately indicate a location or a state of the corresponding food.

Accordingly, in the present disclosure, the exact location and the detailed state can be accurately and intuitively displayed as an LED panel that expresses color via a front surface panel, the camera, and a display panel are in association with each other.

To this end, the present disclosure is to express information related to the refrigerator and the food via the LED panel of the refrigerator to be easily recognized by the user.

In addition, the present disclosure is to effectively view and manage the information and the state of the stored food using the camera, the display panel, and the LED panel mounted on the refrigerator.

In addition, the present disclosure is to propose an optimal location of the food to be received using the camera, the display panel, and the LED panel mounted on the refrigerator.

To this end, the refrigerator of the present disclosure includes at least one panel, and in particular, includes four panels. One of the four panels is equipped with the Android-applied display, and the other three panels have a colored LED lighting-capable structure. Accordingly, the present disclosure is to propose a technology for inputting food information and expiration date information of the food stored in the refrigerator via an internal/external camera or a direct input from the user, and changing a panel color of a corresponding door as the expiration date approaches.

Figure 3:
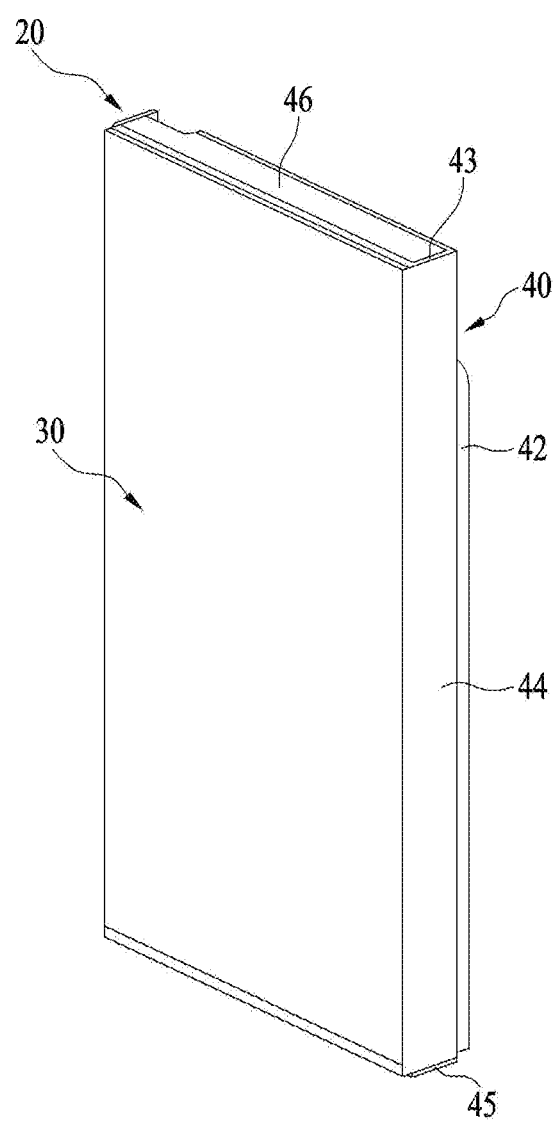
FIG. 3 is a perspective view of a refrigerator door according to an embodiment of the present disclosure.
Figure 4:
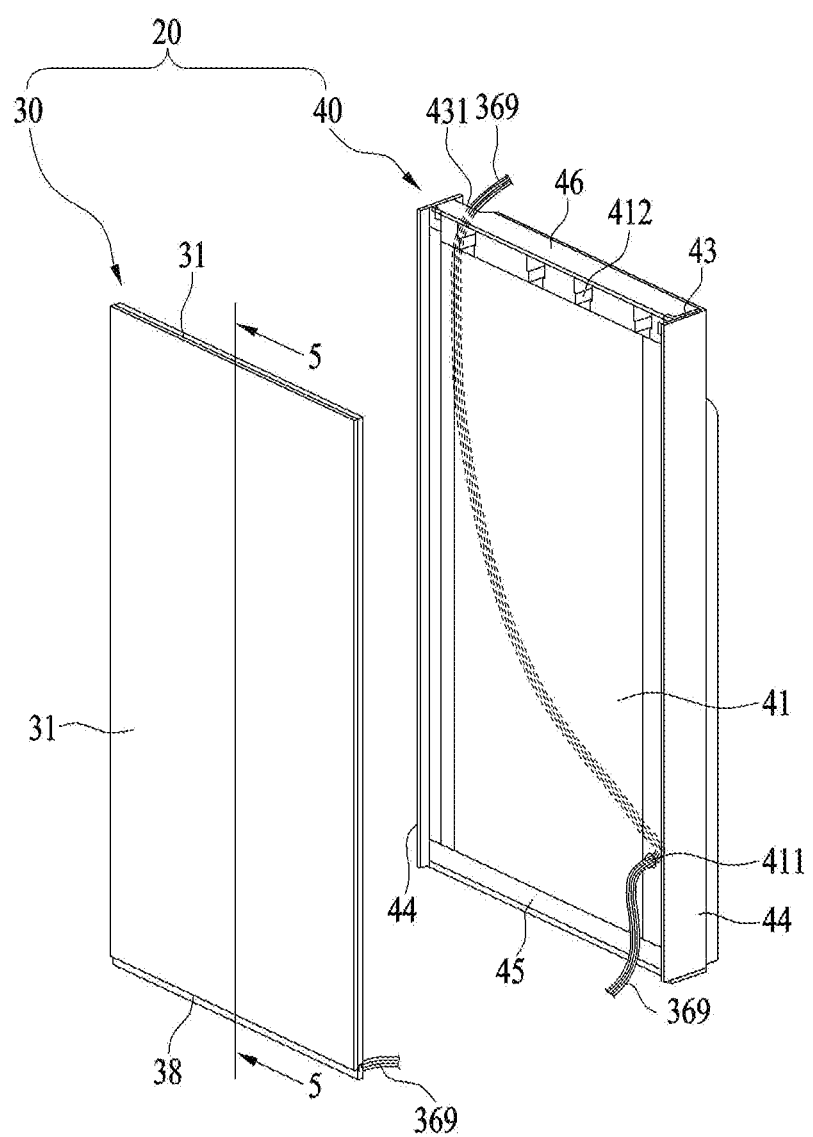
FIG. 4 is a view showing a state in which a panel assembly is separated from a refrigerator door according to an embodiment of the present disclosure.

FIG. 3 is a perspective view of a refrigerator door according to an embodiment of the present disclosure, and FIG. 4 is a view showing a state in which a panel assembly is separated from a refrigerator door. Hereinafter, descriptions duplicate with those of the above drawings will be omitted.

Referring to FIGS. 3 and 4, the door 20 can include a door body 40 that forms an overall shape of the door 20, and a panel assembly 30 that forms an outer appearance of a front surface of the door 20. That is, the door 20 can be constructed such that the panel assembly 30 is mounted on a front surface of the door body 40. A mounting portion 412 for mounting the panel assembly 30 can be disposed at an upper end of the front surface of the door body 40.

The door body 40 can include a body plate 41 that forms the front surface thereof, and a door liner 42 that forms a rear surface thereof.

The body plate 41 can be made of, for example, a metal material, and can be formed in a plate shape having a size corresponding to that of the panel assembly 30. The door liner 42 can be made of, for example, a plastic material, and can form a rear surface shape of the door 20.

The door body 40 can further include side decors 44 that form left and right side surfaces of the door body 40. The side decors 44 can connect left and right side ends of the body plate 41 and left and right side ends of the door liner 42 to each other.

The door body 40 can further include an upper cap decor 43 and a lower cap decor 45 that form a top surface and a bottom surface of the door body 40, respectively. The upper cap decor 43 can be connected to upper ends of the side decors 44, an upper end of the body plate 41, and an upper end of the door liner 42. The lower cap decor 45 can be connected to lower ends of the side decors 44, a lower end of the body plate 41, and a lower end of the door liner 42.

The outer appearance of the door body 40 can be formed by the body plate 41, the door liner 42, the side decors 44, the upper cap decor 43, and the lower cap decor 45. A cap decor cover 46 can be coupled to the upper cap decor 43.

A space inside the door body 40 formed by the coupling of the body plate 41, the door liner 42, the side decors 44, the upper cap decor 43, and the lower cap decor 45 can be filled with an insulating material, and can have a structure that can be insulated such that a heat transfer is not achieved via the door 20. The insulating material can be formed, for example, as a foaming liquid is filled and then cured. The door body 40 can have an inlet to be filled with the foaming liquid.

In one example, the panel assembly 30 can be inserted into the front surface of the door body 40 from the front. As an example, the side decors 44 can protrude further forward, and can be in contact with both side ends of the panel assembly 30, respectively.

The panel assembly 30 can be generally formed in a plate shape, and can be formed in a size corresponding to that of the front surface of the door body 40. Therefore, when the panel assembly 30 is mounted on the front surface of the door body 40, the panel assembly 30 can shield the front surface of the door body 40 to form the outer appearance of the front surface of the door 20. Because the panel assembly 30 forms the outer appearance of the front surface of the door 20, the panel assembly 30 can be referred to as a door panel, and because the panel assembly 30 forms the outer appearance of the front surface of the refrigerator 1, the panel assembly 30 can also be referred to as an exterior panel.

In the state in which the panel assembly 30 is mounted on the door body 40, a rear surface of the panel assembly 30 can be closely fixed to the body plate 41. The panel assembly 30 can have a structure detachable from the door body 40 for service and maintenance.

A front surface of the panel assembly 30 can be exposed to the front in the state in which the panel assembly 30 is mounted on the door body 40, and can form a substantial outer appearance of the front surface of the door 20. The panel assembly 30 can be constructed to emit light from an entirety of the front surface thereof, and can be constructed to emit light with various colors.

To this end, the lighting device 36 can be disposed inside the panel assembly 30. The lighting device 36 can be connected to an electric wire 369 for supply and control of power.

The electric wire 369 can be composed of multiple wire-type electric wires, and can be connected to the lighting device of the panel assembly 30.

One end of the electric wire 369 can be connected to the lighting device 36, and the electric wire 369 can be introduced inwardly of the door body 40 through an electric wire hole 411 defined in the front surface of the door body 40, and can be withdrawn to the outside of the door body 40 through a hinge mounting portion 431 at an upper end of the door body 40. The electric wire hole 411 can be opened through the body plate 41.

An upper hinge 204 can be mounted in the hinge mounting portion 431, and the electric wire 369 can be guided to the cabinet 10 via the upper hinge 204 to be connected to a controller 13 disposed in the cabinet 10.

The electric wire 369 can have a structure connected by a connector at a location between the panel assembly 30 and the door body 40. Accordingly, when the panel assembly 30 is detached or mounted from or on the door body 40, the electric wire 369 can be easily connected.

Hereinafter, a structure of the panel assembly 30 will be described in detail with reference to the drawings.

Figure 6:
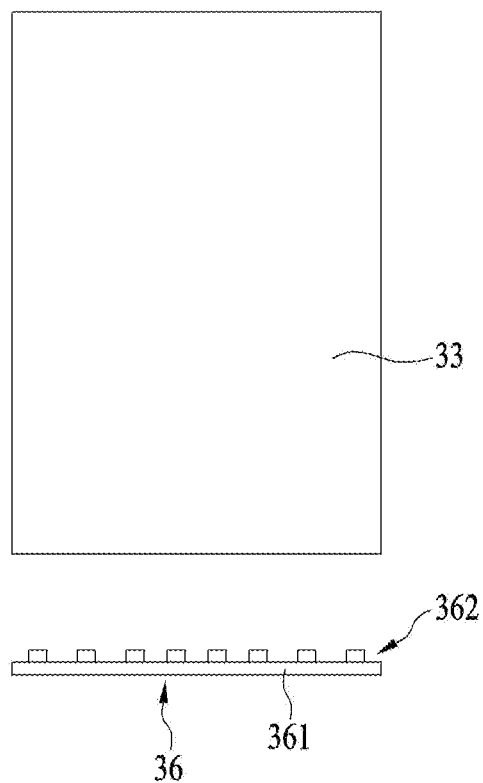
FIG. 6 is a view showing an arrangement of a light guide plate and a light source according to an embodiment of the present disclosure.

FIG. 5 is a cross-sectional view taken along a line 5-5 in FIG. 4, and FIG. 6 is a view showing an arrangement of a light guide plate and a light source. Hereinafter, descriptions duplicate with those of the above drawings will be omitted.

Referring to FIGS. 5 and 6, the panel assembly 30 can include a front plate 31 forming the outer appearance of the front surface thereof, the lighting device 36 irradiating light such that the front plate 31 emits light, and a light guide plate 33 guiding the light irradiated from the lighting device 36.

The panel assembly 30 can include a diffusing member 32 that allows the light guide plate 33 and the front plate 31 to be spaced apart from each other and diffuses light. The diffusing member 32 can also be referred to as a support member in an aspect that the diffusing member 32 supports the light guide plate 33.

The lighting device 36 and the light guide plate 33 can be mounted in or supported by the diffusing member 32.

The panel assembly 30 can further include a back cover 39 forming a rear surface of the panel assembly 30.

The front plate 31 can be formed in a rectangular plate shape, and can be made of a material capable of transmitting light. For example, the front plate 31 can be made of a glass material, such as blue glass, white glass, and deposited glass, or another material capable of transmitting light, such as ABS, PMMA, PC, and the like. The front plate 31 can be referred to as a transparent plate or an out plate.

The front plate 31 can be formed to be transparent such that light reflected by the light guide plate 33 can be transmitted therethrough. In this regard, transparency can be defined as a degree to which the light reflected from the light guide plate can be transmitted through the front plate 31 and irradiated to the outside.

The front plate 31 can be formed to have a color, and can be formed to exhibit a different color depending on the operation or an on/off state of the lighting device 36. For example, a specific design or pattern can be printed on the front plate 31 to have a specific color. A film printed with the pattern having the specific design or color can be attached to the front plate 31, a surface treatment, such as imprinting, etching, or glass printing, can be performed on the front plate 31, or a coating or deposition layer having a specific color and texture can be formed to form an outer appearance of the front plate 31.

The front plate 31 can be constructed such that the light irradiated from the lighting device 36 is transmitted therethrough but components at the rear of the front plate 31 are not reflected. That is, the front plate 31 can prevent components inside the panel assembly 30 from being seen outside through the front plate 31 by the color of the front plate 31 itself when the lighting device 36 is turned off.

In this regard, the front plate 31 can be formed to have a color that is at least not black and has a brightness equal to or higher than 0 when the lighting device 36 is turned off. That is, in the state in which the refrigerator 1 is installed, the front surface of the refrigerator 1 can exhibit a color other than the black, and the color of the front surface of the refrigerator can be changed based on the operation of the lighting device 36.

In the panel assembly 30, an entirety of the front surface of the front plate 31 can be exposed to the outside. Therefore, because an entirety of the light diffused by the diffusing member 32 can pass through the front plate 31, the entirety of the front surface of the front plate 31 can emit light.

A rear surface of the front plate 31 can be coupled to a front surface of the diffusing member 32.

The light guide plate 33 can be spaced apart from and located at the rear of the front plate 31 by the diffusing member 32, and can guide the light irradiated from the lighting device 36 disposed below the light guide plate 33 to the front.

For example, the light guide plate 33 can be made of a transparent polymer material such as acrylic. In the light guide plate 33, a diffusing agent for diffusing the light incident on the light guide plate 33 can be added, or a pattern for diffusing the light can be formed. Therefore, the light can be transmitted to the front plate 31 by the light guide plate 33. In this regard, the pattern of the light guide plate 33 can be set such that the entirety of the front surface of the front plate 31 can emit light with uniform brightness.

In this regard, various structures of the light guide plate 33 and the lighting device 36 that can be achieved in one embodiment of the present disclosure will be described in detail with reference to FIG. 12 below.

A load of the light guide plate 33 can be supported by the diffusing member 32, and the front surface of the light guide plate 33 can be pressed toward the diffusing member 32 by the back cover 39.

In one example, the diffusing member 32 can be disposed between the front plate 31 and the light guide plate 33. The diffusing member 32 can keep the light guide plate 33 at a certain spacing from the front plate 31, and can diffuse the light irradiated from a light exit surface of the light guide plate 33.

The diffusing member 32 can include a plate-shaped front surface 321 on which the front plate 31 is mounted, and an extended portion extending from a perimeter of the front surface 321. The front surface 321 and the extended portion can define therein an accommodating space 320a for the light guide plate 33 to be located.

The extended portion can be disposed to cover the perimeter of the light guide plate 33. The perimeter of the light guide plate 33 can include, for example, a top surface, a bottom surface, and both side surfaces of the light guide plate 33.

As an example, the extended portion can include an upper extended portion 322 extending from an upper end of a rear surface of the front surface 321, a lower extended portion 324 extending from a lower end of the rear surface of the front surface 321, and a pair of side surfaces extending from both left and right side ends of the front surface 321.

The upper extended portion 322, the lower extended portion 324, and the pair of side surfaces can define therein the accommodating space 320a for the light guide plate 33 to be located. Therefore, the diffusing member 32 can serve to not only diffuse the light, but also to accommodate and support the light guide plate 33 therein.

The front surface 321 can be formed in the plate shape corresponding to the front plate 31, and the front surface of the light guide plate 33 can be in close contact with a rear surface of the front surface 321.

In the present embodiment, because the front surface 321 of the diffusing member 32 is entirely disposed between the front plate 31 and the light guide plate 33, even when the light guide plate 33 is deformed by heat, the light guide plate 33 can be prevented from being in direct contact with the front plate 31. Accordingly, an occurrence of dark areas such as stains on the front plate 31 can be prevented.

The front surface 321 and the rear surface of the front plate 31 can be coupled to each other by an adhesive portion 313. The adhesive portion 313 can include, for example, a sealant or a double-sided tape.

The side surfaces can extend rearwards from the both left and right side ends of the front surface 321 to constrain the left and right side surfaces of the light guide plate 33. The side surfaces can be spaced apart from at least one of the left and right side surfaces of the light guide plate 33. When the light guide plate 33 moves in a left and right direction, the side surfaces can be in contact with and constrain at least one of the left and right side surfaces.

Each of the upper extended portion 322 and the lower extended portion 324 can extend rearwards from the front surface 321, and a length of each of the upper extended portion 322 and the lower extended portion 324 can be greater than a thickness of the light guide plate 33.

The diffusing member 32 can be made of a material capable of transmitting and diffusing the light, and can be formed by being injection-molded or extruded as a single component.

An entirety of the diffusing member 32 can be made of a transparent or translucent material. The diffusing member 32 itself can be formed to have a color. Therefore, when viewing the panel assembly 30 from the front, the color, a texture, or a shape of the front surface of the panel assembly 30 can be determined by the diffusing member 32.

The diffusing member 32 can further include a light guide plate support 326 for supporting a bottom surface 333 of the light guide plate 33. The light guide plate support 326 can extend rearwards from the rear surface of the front surface 321, and can be disposed above the lower extended portion 324 to be spaced apart from the lower extended portion 324.

In order to stably support the load of the light guide plate 33, the diffusing member 32 can include a plurality of light guide plate supports 326. A plurality of light guide plate supports 326 can be arranged to be spaced apart from each other in a horizontal direction.

The diffusing member 32 can accommodate the lighting device 36 therein. The diffusing member 32 can include an accommodating groove (or an accommodating portion) 324a for accommodating a portion of the lighting device 36 therein.

The accommodating groove 324a can be defined as a portion of the rear surface of the front surface 321 is depressed forward. The accommodating groove 324a can be located between the light guide plate support 326 and the lower extended portion 324. Accordingly, when the lighting device 36 is accommodated in the accommodating groove 324a, the lighting device 36 can be located below the light guide plate support 326.

The lighting device 36 can include a substrate 361 and a light source 362. The substrate 361 can be formed in a plate shape, and can be formed long in the left and right direction.

A plurality of light sources 362 can be continuously arranged at a regular spacing on the substrate 361. The light source 362 can be disposed to irradiate light toward the bottom surface 333 of the light guide plate 33. That is, the bottom surface 333 of the light guide plate 33 is a light entrance surface, and a front surface 331 of the light guide plate 33 is the light exit surface.

The substrate 361 can provide a space for the light sources 362 to be continuously arranged from a left end to an opposite end of the light guide plate 33.

The light source 362 can be disposed vertically below the bottom surface 333 of the light guide plate 33, that is, disposed to face the bottom surface 333 of the light guide plate 33.

The light source 362 can be constructed as an LED, for example. The light source 362 can be constructed as an RGB LED capable of irradiating light of various colors under control of a controller 13, which will be described later. That is, the light source 362 can irradiate the light of the various colors under the control of the controller 13, which will be described later, and thus, the front plate 31 can emit the light with the color set by the controller 13. The outer appearance color of the front surface of the refrigerator 1 can be determined based on the color of the front plate 31.

The light source 362 can be constructed as an LED irradiating light of a specific color other than the RGB LED, or can be constructed as a combination of a plurality of LEDs irradiating light of different colors. For example, the plurality of light sources 362 can be constructed as red, green, and blue LEDs, and can be repeatedly arranged in an order. Under the control of the controller 13, operations of the light sources 362 can be combined with each other to make the front plate 31 emit light of a desired color.

The panel assembly 30 can further include a substrate supporter 37 seated on the lower extended portion 324 of the diffusing member 32.

The substrate supporter 37 can support the substrate 361 in the state of being seated on the lower extended portion 324. The substrate supporter 37 can dissipate heat generated from the lighting device 36 by conduction.

A portion of the substrate supporter 37 can be accommodated in the accommodating groove 324a. The substrate supporter 37 can be in contact with the back cover 39 in a state in which the back cover 39 is assembled. Accordingly, the heat generated from the lighting device 36 can be transferred to the back cover 39 via the substrate supporter 37, and can be dissipated via the back cover 39.

The panel assembly 30 can further include a rear supporter 34 for supporting the rear surface of the light guide plate 33. The rear supporter 34 can be formed in a plate shape and can be attached to the rear surface of the light guide plate 33 by the adhesive portion.

The rear supporter 34 can be made of an opaque material that limits the transmission of light. The rear supporter 34 can be accommodated in the accommodating space 320a defined by the diffusing member 32. The upper extended portion 322 can cover a top surface of the rear supporter 34, and the side surfaces 327 and 328 can cover both side surfaces of the rear supporter 34.

The light irradiated from the light source 362 can be effectively irradiated toward the light guide plate 33, and the light reflected via the light guide plate 33 can make the front plate 31 emit light with a set brightness.

The rear supporter 34 can include an opening 342 through which a portion of the back cover 39 extends. The back cover 39 can include a cover body 391 and a bent portion extending from an edge of the cover body 391 in the horizontal direction.

The cover body 391 can be in contact with a rear surface of the rear supporter 34. The cover body 391 can be attached to the rear supporter 34 by the adhesive portion or can be coupled to the rear supporter 34 by a fastening member such as a screw.

The bent portion can extend from the edge of the cover body 391 forward, and can include an upper bent portion 393, a lower bent portion 396, and a pair of side bent portions. The bent portion can be in contact with the diffusing member 32. The bent portion can be adhered to the extended portion of the diffusing member 32 by the adhesive portion, for example.

For example, the upper bent portion 393 can be seated in an upper seating groove 323 in a depressed shape defined in the upper extended portion 322 of the diffusing member 32.

The lower bent portion 396 can be in contact with a bottom surface of the lower extended portion 324 of the diffusing member 32. The side bent portion can be seated in a side seating groove of the depressed shape defined in the side extended portion.

In the present embodiment, because the diffusing member 32 supports the light guide plate 33 and fixes the location of the light guide plate 33, and the back cover 39 is coupled to surround a portion of the diffusing member 32, the number of parts of the panel assembly 30 itself can be reduced and a thickness in a front and rear direction of the panel assembly 30 can be reduced.

The cover body 391 can further include a pressing portion 392 bent toward the light guide plate 33. The pressing portion 392 can extend through the opening 342 of the rear supporter 34 to be in contact with the rear surface of the light guide plate 33.

In the present embodiment, the cover body 391 can press the rear supporter 34 toward the rear surface of the light guide plate 33 in the state of being in contact with the rear surface of the rear supporter 34, and the pressing portion 392 can directly press the light guide plate 33.

The panel assembly 30 of the present embodiment can further include a lower trim 35. The lower trim 35 can be coupled to the diffusing member 32 by coupling means such as an adhesive portion or a hook.

The lower trim 35 can include a first portion 351 extending in the vertical direction and a second portion 352 extending in the horizontal direction from a lower end of the first portion 351. At least the first portion 351 can be formed to be opaque or translucent, and can be formed to have a specific color when necessary.

The first portion 351 can cover a portion of the diffusing member 32 extending downwardly of the bottom surface 311 of the front plate 31. For example, the first portion 351 can be disposed in front of the accommodating groove 324a of the diffusing member 32 to face the accommodating groove 324a.

The second portion 352 can support the lower extended portion 324. The second portion 352 can include therein a seating groove 393 in which the lower bent portion 396 of the back cover 39 is seated.

Figure 7:
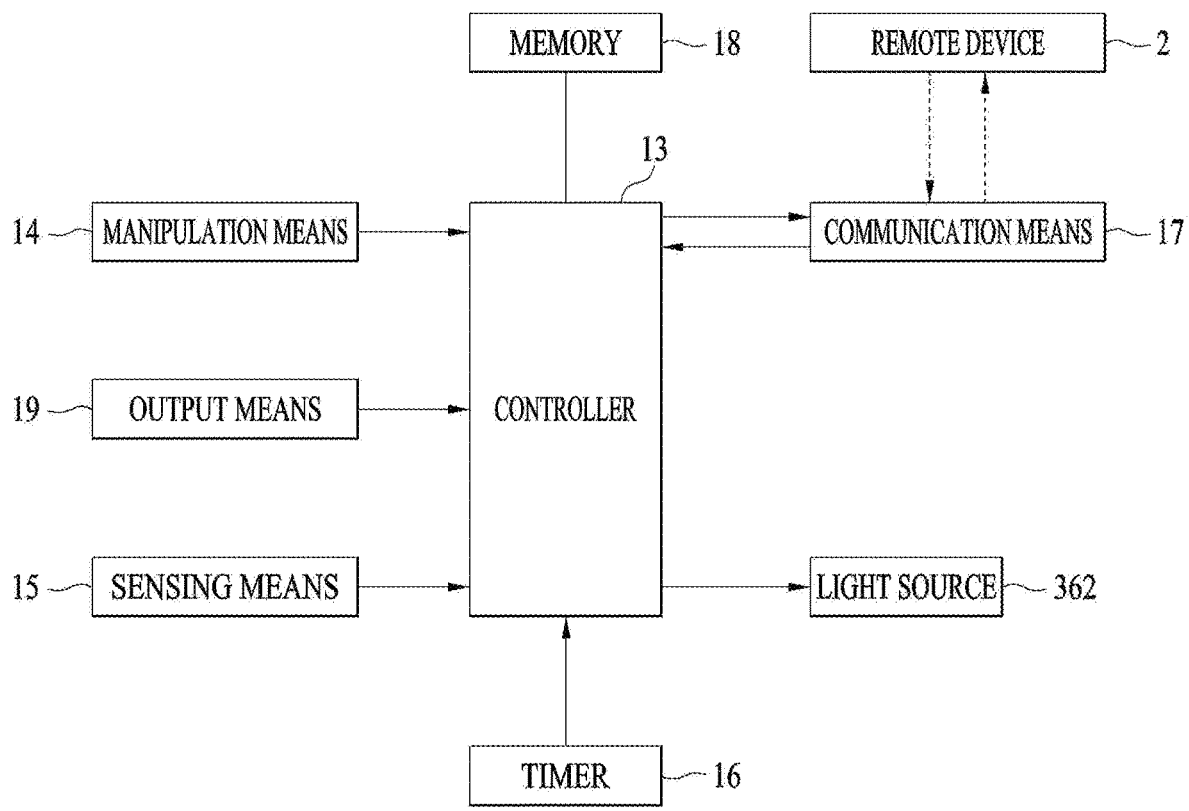
FIG. 7 is a block diagram showing a flow of a control signal of a refrigerator according to an embodiment of the present disclosure.
Figure 8:
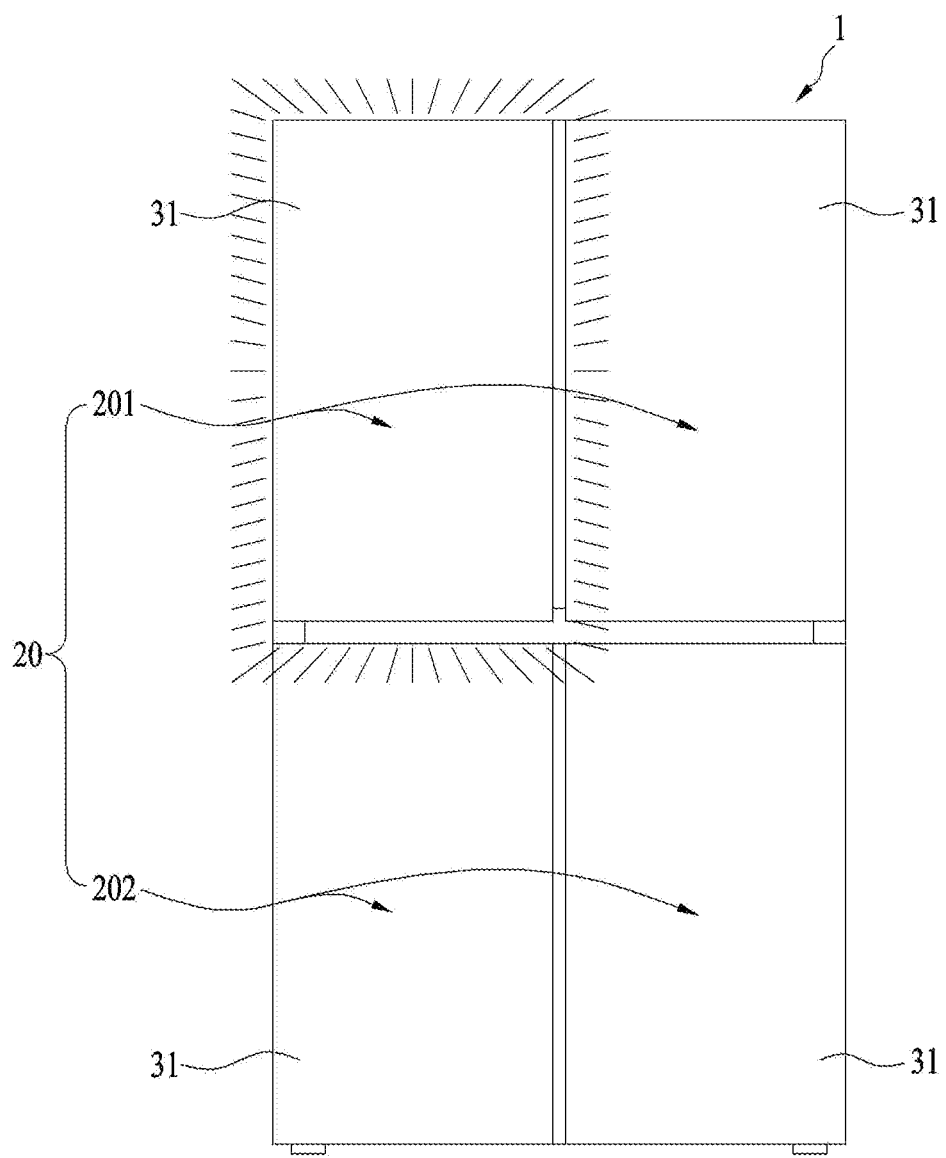
FIG. 8 is a view showing a state in which some of doors are emitting light in a refrigerator according to an embodiment of the present disclosure.
Figure 9:
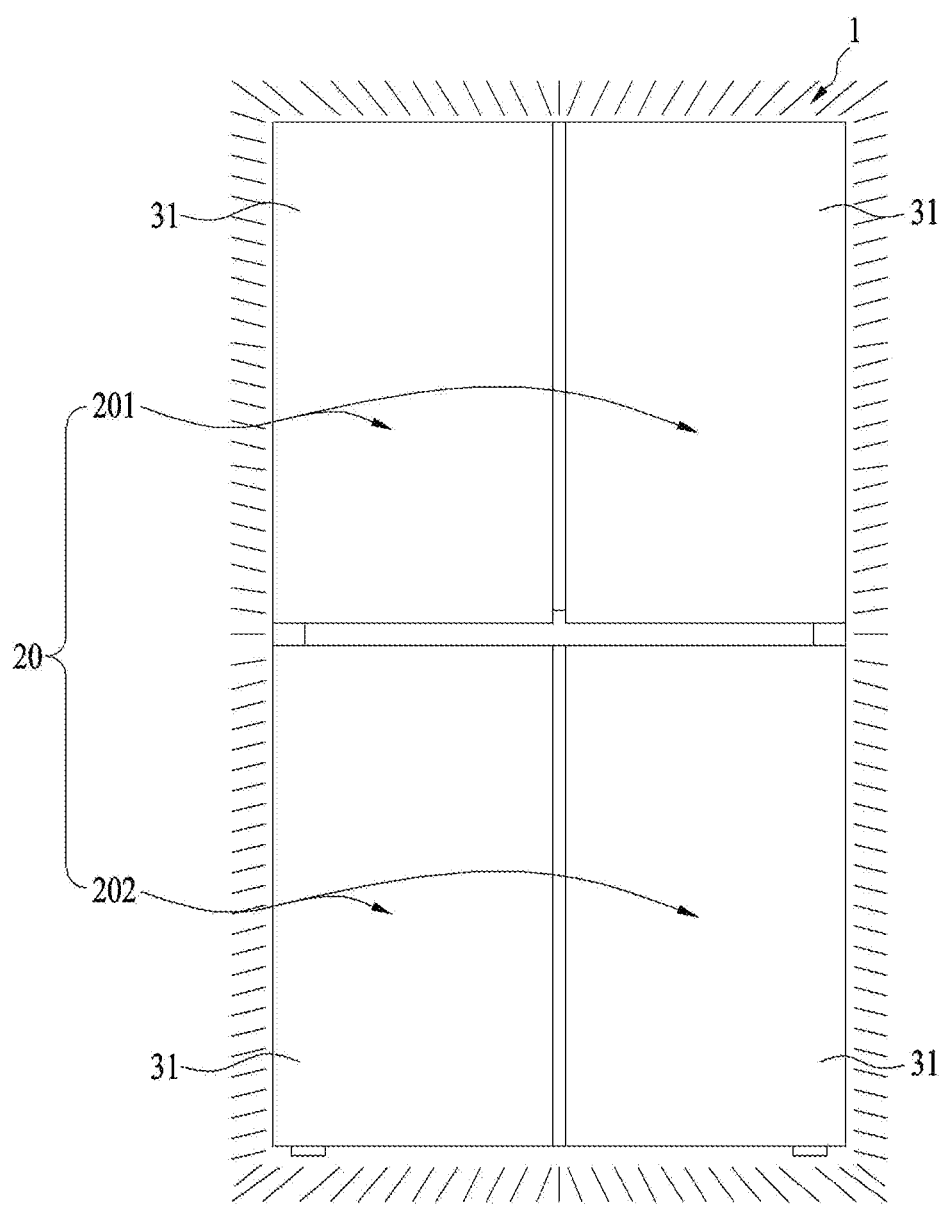
FIG. 9 is a view showing a state in which all of a plurality of doors are emitting light in a refrigerator according to an embodiment of the present disclosure.

FIG. 7 is a block diagram showing a flow of a control signal of a refrigerator according to an embodiment of the present disclosure, FIG. 8 is a view showing a state in which some of doors are emitting light in a refrigerator according to an embodiment of the present disclosure, and FIG. 9 is a view showing a state in which all of a plurality of doors are emitting light in a refrigerator according to an embodiment of the present disclosure. Hereinafter, descriptions duplicate with those of the above drawings will be omitted.

In the refrigerator 1 according to the embodiment of the present disclosure, the front surface of the door 20 can emit light by the operation of the lighting device 36.

The front surface of the door 20 can emit light with one of a plurality of colors under the control of controller 13. The operation of the lighting device 36 can be achieved via user's manipulation of manipulation means 14. The manipulation means 14 can be disposed at one side of the refrigerator 1, for example, at one side of the cabinet 10. In one example, the manipulation means 14 can be disposed on the door 20 as needed, and can be pressed by manipulation of touching the front plate 31. In other words, the user can set the operation of the lighting device 36 by directly manipulating the manipulation means 14, and can also turn the lighting device 36 on or off.

The user can set an operation state of the lighting device 36, such as an operation time and an operation condition of the lighting device 36, a color of light emitted from the light source 362, and the like, via the manipulation of the manipulation means 14. In addition, various commands related to the operation of the refrigerator can be input via the manipulation of the manipulation means 14. When necessary, the manipulation means 14 can be constructed as a display on which display of information and manipulation are possible.

The operation of the lighting device 36 can be manipulated and the operation condition and the like of the lighting device 36 can be set via a remote device 2 that is spaced apart from the refrigerator 1. The refrigerator 1 can be in communication with the remote device 2 via communication means 17 connected to the controller 13, and the user can control the operation of the lighting device 36 via the remote device 2.

The communication means 17 can be in communication with the remote device 2 and/or a server managing a home appliance in various manners. For example, the communication means 17 can have a structure capable of communicating in at least one of wired, wireless, and short-range communication (BLUETOOTH, Wi-Fi, ZIGBEE, NFC, and the like) manners. The remote device 2 can be various devices capable of communicating, such as a dedicated terminal, a mobile phone, a tablet, a portable PC, a desktop PC, a remote control, and a Bluetooth speaker.

The user can manipulate and set the operation state of the lighting device 36, such as the operation time and the operation condition of the lighting device 36, the color of the light emitted from the light source, and the like, via the manipulation of the remote device 2. For example, easy manipulation and setting can be possible via an application or a dedicated program installed on the user's mobile phone.

The refrigerator 1 can further include a timer 16. The timer 16 can count a time elapsed after an occurrence of a specific event.

In one example, the lighting device 36 can be operated by a result of sensing by the sensing means 15.

The sensing means 15 can include, for example, a user detection sensor that senses proximity of the user. As the user detection sensor, various devices capable of sensing that the user approaches the refrigerator, such as an infrared sensor, an ultrasonic sensor, or a laser sensor, can be used.

The user detection sensor can be disposed at one side of the cabinet 10 or the door 20, and can be disposed at various locations for sensing the proximity of the user. The user detection sensor can include a plurality of sensors located at different locations. Therefore, when the user approaches the refrigerator 1 by a reference distance for use of the refrigerator 1, the user detection sensor can sense the approach, transmit a signal to the controller 13, and allow the lighting device 36 to be turned on. When the user moves away from the refrigerator 1, the user detection sensor can sense the same, transmit a signal to the controller 13, and allow the lighting device 36 to be turned off.

The refrigerator can further include output means 19. The output means 19 can include, for example, a speaker for outputting a sound. Voices, various sounds, or music can be output from the speaker. The output means 19 can be disposed on the door or on the cabinet.

The speaker can be operated by directly communicating with the remote device, and the operation thereof can be controlled by the controller 13. In one example, when describing the operation state of the lighting device operated by the controller 13, as shown in FIG. 6, when the lighting device 36 is turned on in response to instruction of the controller 13, the light irradiated from the light source 362 can be irradiated to the bottom surface 333 of the light guide plate 33, and can be guided along the light guide plate 33.

In this regard, the light guided by the light guide plate 33 can pass through the light exit surface, diffuse through the front surface 321, and then pass through the front plate 31 to be transmitted to the outside. Accordingly, an entirety of the front plate 31 can brightly emit light, and the front surface of the door 20 can emit light with the set brightness or color.

When the lighting device 36 is turned on, the front surface of the door 20 can brightly emit light, and the front surface of the door 20 can emit light with the set color by the light irradiated from the light source 362. In this regard, the color of the front surface of the door 20 can be different in color or brightness from a color in the state in which the lighting device 36 is turned off.

That is, the color of the front plate 31 can be seen as the color of the front surface of the door 20, and a texture and a pattern formed on the front plate 31 can be seen. In this regard, the color of the front plate 31 can be a color with a brightness higher than 0, and can be a color other than the black. The color of the front surface of the door 20 in the state in which the lighting device 36 is turned off can be referred to as a first color (or a background color).

Therefore, the front surface of the door 20 will be seen with the color of the front plate 31. In this regard, because of the color of the front plate 31, components inside the panel assembly 30 are not be seen from the outside through the front plate 31.

In such state, the lighting device 36 can be turned on. When the lighting device 36 is turned on, the front surface of the door 20 will emit light with the color set by the controller 13.

The front surface of the door 20 can be controlled to emit light with a second color different from the first color, and the lighting device 36 can control the light source 362 such that the door 20 can emit light with the second color under the control of the controller 13.

In this regard, a color of the light irradiated from the light source 362 can be different from the second color. That is, because the front plate 31 has the first color, when the light of the second color is irradiated from the light source 362, the light can interact with the first color in the process of passing through the front plate 31, so that the door 20 can actually emit light with a third color.

Therefore, in the present embodiment, controlling the light source 362 such that the door 20 emits light with a specific color can mean controlling the color of the light irradiated from the light source 362 in consideration of the color of the front plate 31 itself.

That is, in the state in which the light source 362 is turned on, the color of the light emitted from the door 20 can be a color in which the color of the front plate 31 itself and the color of the light irradiated from the light source 362 are mixed with each other.

In one example, some doors 20 among the plurality of doors 20 forming the outer appearance of the front surface of the refrigerator 1 can emit light, or the plurality of door 20 can independently emit light to form the outer appearance of the front surface of the refrigerator 1 with the set color.

The refrigerator 1 can be operated such that some doors 20 of the plurality of doors emit light or emit light with a specific color. That is, the lighting devices 36 arranged in the doors 20 may not all be operated, but only some of the entire doors 20 can emit light. For example, one of the refrigeration compartment doors 201 can emit light.

The left refrigeration compartment door and the right refrigeration compartment door can emit light in different colors as required. At least two doors 20 among the doors 20 can be sequentially changed in color, and at least two doors 20 can be sequentially turned on and off.

In this regard, the lighting device 36 disposed in the panel assembly 30 can be controlled by the controller 13 under the various conditions described above.

In one example, the refrigeration compartment door and the freezer compartment door among the doors can be controlled to emit light in different colors.

The controller 13 can control the lighting devices 36 such that the pair of refrigeration compartment doors 201 are seen in the first color. The controller 13 can control the lighting devices 36 such that the pair of refrigeration compartment doors 201 are seen in the second color.

In one example, operation control of the lighting device 36 to be described below is not limited to the structure of the panel assembly or the structure of the door described above. That is, at least one of the plurality of components constituting the panel assembly can be omitted, at least one of the plurality of components can be replaced with another component, or a location of at least one component of the plurality of components can be changed.

Herein, the change in the state of the light source 362 can include at least one of the change in the state of the light source 362 from the off state to the on state, the change in the state of the light source 362 from the on state to the off state, one or more LEDs being turned on from the state in which the light source 362 is turned off, the light source 362 being turned off from the state in which the one or more LEDs are turned on, a change in brightness of the light irradiated from the light source 362 in the state in which the light source 362 is turned on, a change in brightness or color of light irradiated from some of the plurality of LEDs in the state in which the light source 362 is turned on, a change in the number of LEDs that are turned on (an increase in the number of LEDs that are turned on or a decrease in the number of LEDs that are turned on), and a change in the color of the light irradiated from the light source 362 in the state in which the light source 362 is turned on.

The state in which the light source 362 is turned on means a state in which all of the plurality of LEDs are turned on, and the state in which the light source 362 is turned off means a state in which all of the plurality of LEDs are turned off.

Figure 10:
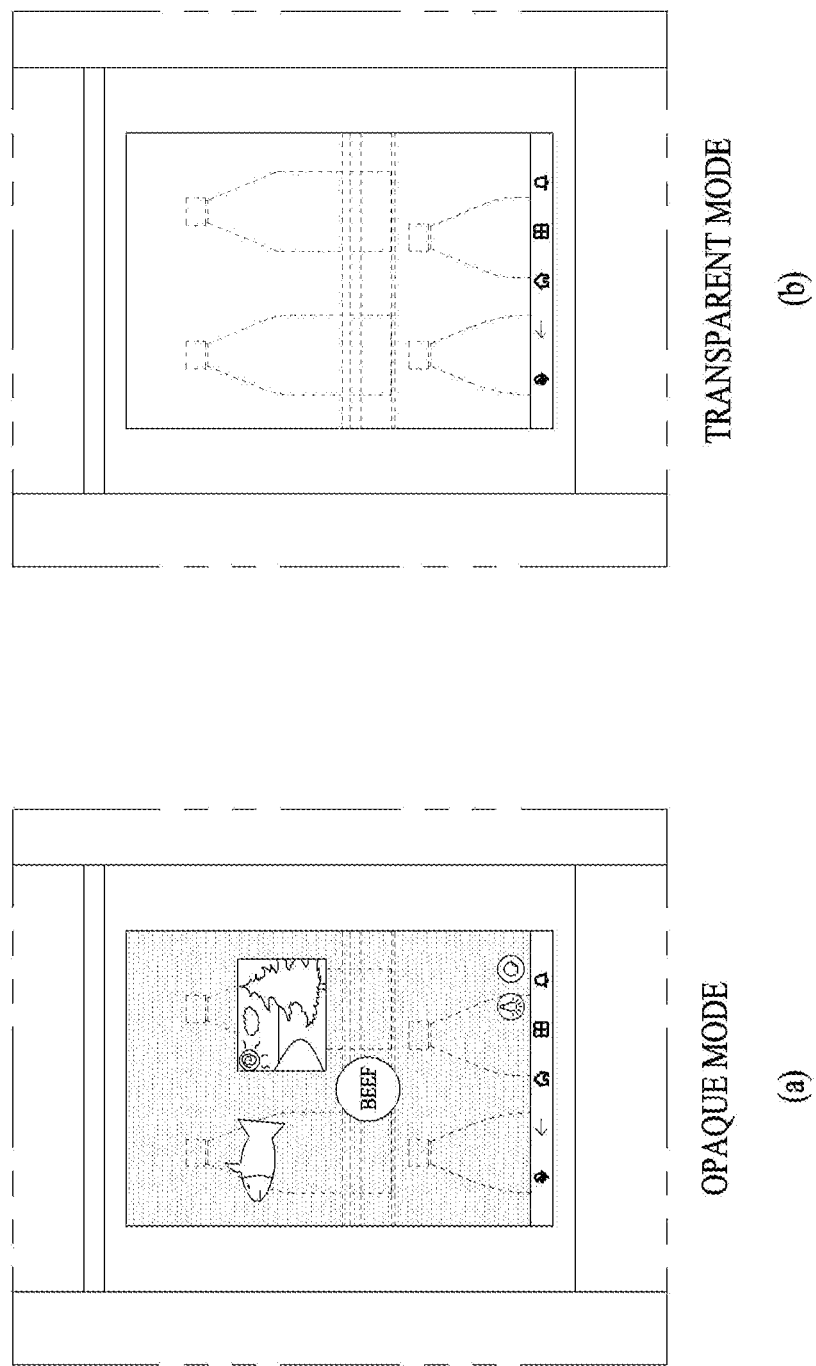
FIG. 10, including parts (a) and (b), and FIG. 11, including parts (a)-(d), are views for illustrating a display door having a transparent display panel according to an embodiment of the present disclosure.
Figure 11:
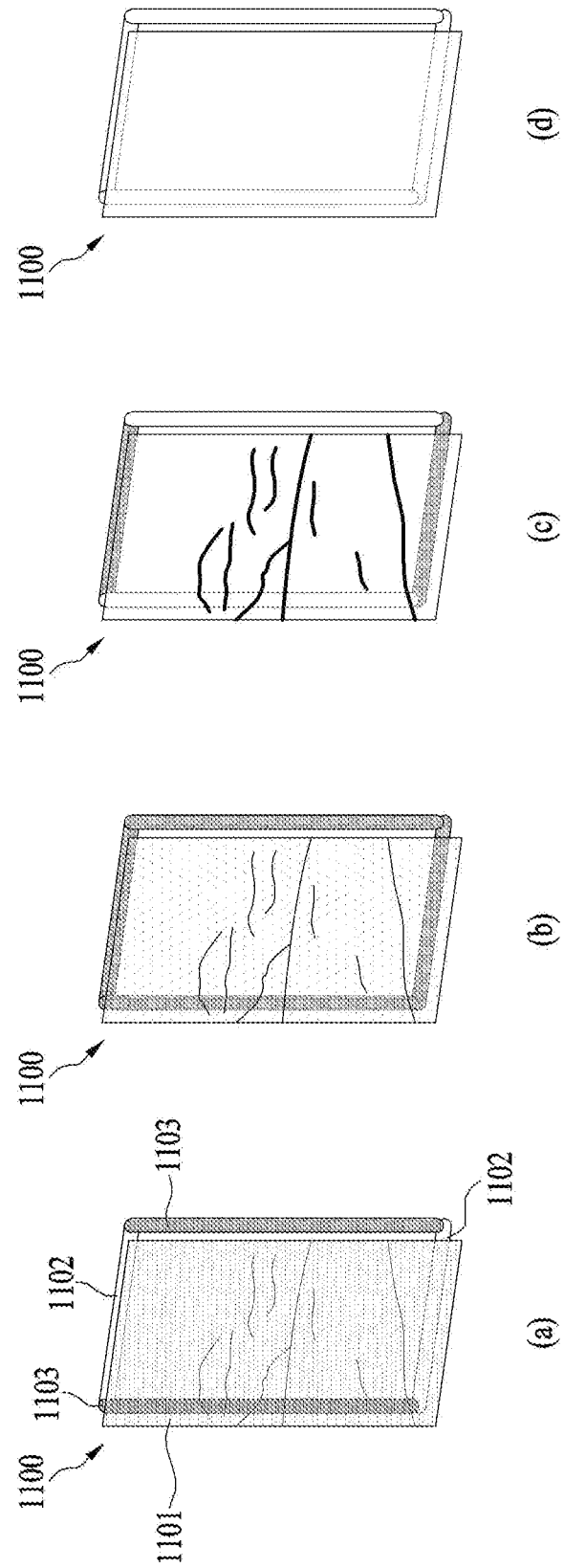

FIGS. 10 and 11 are views for illustrating a display door having a transparent display panel according to an embodiment of the present disclosure. Hereinafter, descriptions duplicate with those of the above drawings will be omitted.

As described above in FIGS. 1 and 2, the right refrigeration compartment door 201b of the refrigerator can be equipped with the Android-applied display, and the Android-applied display can use a transparent display panel that can switch between a transparent mode, a translucent mode, and an opaque mode.

A left view in FIG. 10 shows an embodiment in which the display panel included in the display door operates in the opaque mode, and a right view in FIG. 10 shows an embodiment in which the display panel included in the display door operates in the transparent mode.

When the display panel operates in the opaque mode as shown in the left view in FIG. 10, because the display door is operated with the Android-applied display, various user interfaces can be output on the display panel.

On the other hand, when the display panel operates in the transparent mode as shown in the right view in FIG. 10, the user can check the inside of the refrigerator through the display door.

(a) in FIG. 11 is a view illustrating the transparent mode, (b) in FIG. 11 is a view illustrating the translucent mode, (c) in FIG. 11 is a view illustrating the opaque mode, and (d) in FIG. 11 is a view illustrating a light off mode.

A display panel 1100 in FIG. 11 can include an outermost LCD panel 1101, an LCD backlight module 1102, and an internal LED 1103. In this regard, the LCD backlight module 1102 can be located at the rear of the LCD panel 1101 and emit light. In addition, although the internal LED 1103 in FIG. 11 is shown as being located at each of both left and right side ends of the display panel 1100, this is only an example. The internal LED 1103 can be shown differently in subsequent drawings.

In order to operate in the transparent mode as shown in (a) in FIG. 11, the display panel 1100 can turn on only the internal LED 1103.

In addition, in order to operate in the translucent mode as shown in (b) in FIG. 11, the display panel 1100 can turn on both the LCD backlight module 1102 and the internal LED 1103. In this regard, the display panel 1100 can execute the translucent mode via brightness adjustment of the LCD backlight module 1102 and the internal LED 1103.

In addition, in order to operate in the opaque mode as shown in (c) in FIG. 11, the display panel 1100 can turn on only the LCD backlight module 1102.

Lastly, in order to operate in the light off mode as shown in (d) in FIG. 11, the display panel 1100 can turn off both the LCD backlight module 1102 and the internal LED 1103. Accordingly, an image being output on the display panel 110 becomes almost invisible.

Figure 12:
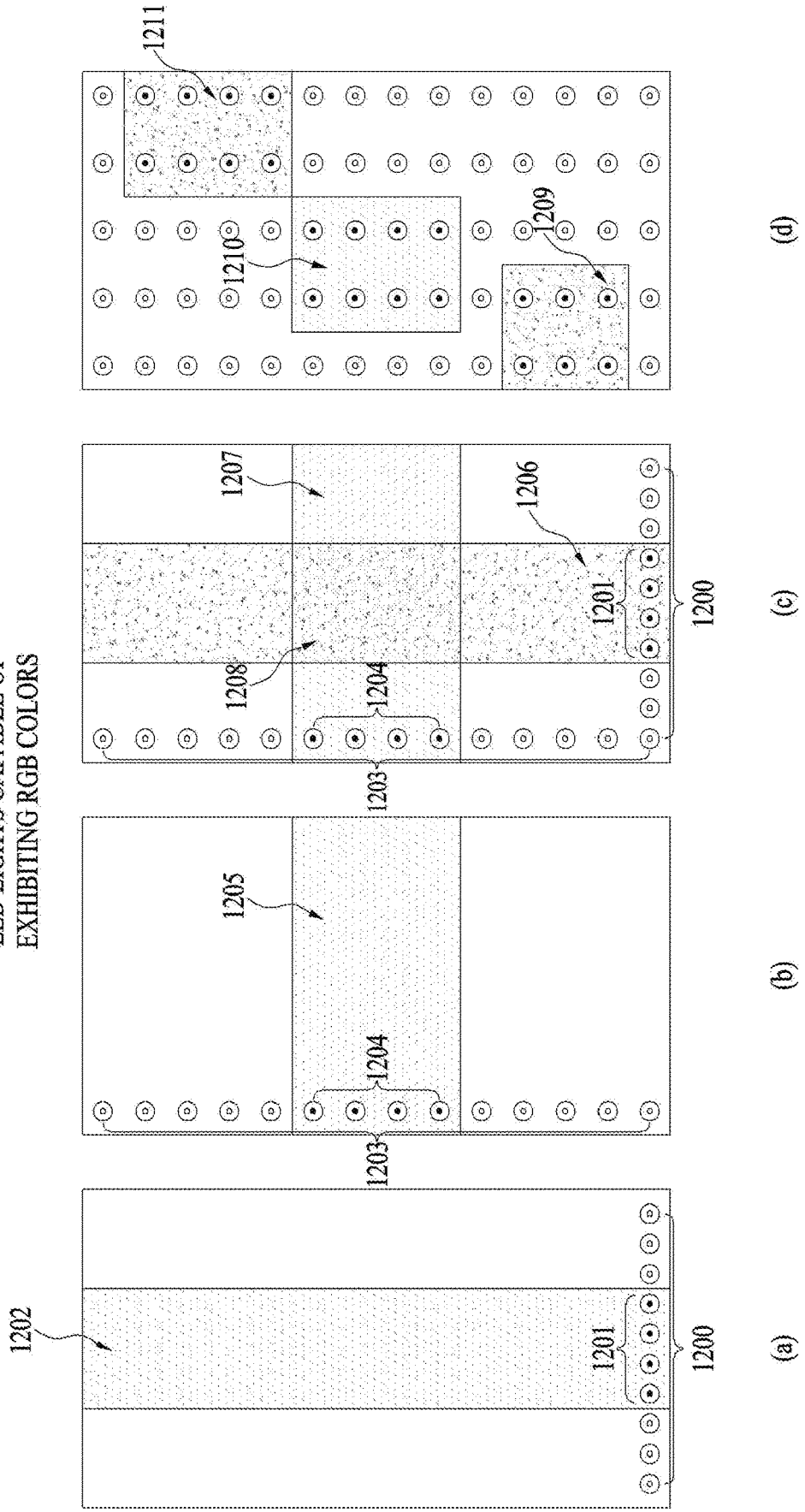
FIG. 12, including parts (a)-(d), is a view for illustrating locations of a light guide plate and a light source of an LED door according to an embodiment of the present disclosure.

FIG. 12 is a view for illustrating locations of a light guide plate and a light source of an LED door according to an embodiment of the present disclosure. Hereinafter, descriptions duplicate with those of the above drawings will be omitted.

(a) to (d) in FIG. 12 are views showing a front surface of a door equipped with light sources among the doors of the refrigerator described above. In particular, (a) to (d) in FIG. 12 show a door with different locations of the light sources. In this regard, (a) to (d) in FIG. 12 mainly illustrate an arrangement of the light sources. The front plate, the light guide plate, and the like will be omitted because it has been described above in FIG. 6 that the front plate, the light guide plate, and the like are naturally included to guide the light output from the light source.

More specifically, (a) in FIG. 12 shows an embodiment in which the light sources are located at a lower edge, (b) in FIG. 12 shows an embodiment in which the light source are located at a side edge, (c) in FIG. 12 shows an embodiment in which the light sources are located at the lower and side edges, and (d) in FIG. 12 shows an embodiment in which the light sources are located perpendicular to the front plate of the door. In this regard, the locations of the light sources are merely an example, and the light sources can be located at an upper edge or at a right side.

Accordingly, because the light sources are located at the lower edge in (a) in FIG. 12, when the light is irradiated from the light sources, the light guide plate can transmit the light irradiated from in an upward direction to the front plate. In this regard, as shown in (a) in FIG. 12, the controller of the refrigerator can turn on only some light sources 1201 among a plurality of light sources 1200 arranged at the lower edge. In this case, from a user's point of view, only a first region 1202 is seen in the first color, not the light is emitted from the door front surface.

Similarly, in (b) in FIG. 12, because the light sources are located at the side edge, when the light is irradiated from the light sources, the light guide plate can transmit the light irradiated in a rightward direction to the front plate. Similarly, as shown in (b) in FIG. 12, the controller of the refrigerator can turn on only some light sources 1204 among a plurality of light sources 1203 arranged at the left side. In this case, from the user's point of view, only a second region 1205 is seen in the second color, not the light is emitted from the door front surface.

When the light sources are located at both the lower edge and the left side edge, as shown in (c) in FIG. 12, both the embodiments in (a) and (b) in FIG. 12 can be included. In one embodiment, the controller of the refrigerator can allow some light sources 1201 of the light sources 1200 located at the lower edge and some light sources 1204 of the light sources 1203 located at the left side to emit light of different colors. In this case, from the user's point of view, it appears that different colors are output from a third region 1206, a fourth region 1207, and a fifth region 1208.

Finally, as shown in (d) in FIG. 12, the light sources can be located perpendicular to the front plate. That is, the light sources are not located at the bottom or the side of the door to irradiate light in an x-axis direction or a y-axis direction, but are located perpendicular to the door to irradiate light in a z-axis direction. This can be referred to as a direct-type structure.

In one embodiment, the controller of the refrigerator can output different colors from a sixth region 1209, a seventh region 1210, and an eighth region 1211 by individually controlling the light sources located on the front surface of the door. Accordingly, the user can see that the different colors are output from the sixth region 1209, the seventh region 1210, and the eighth region 1211.

In addition, the light sources shown in (a) to (d) in FIG. 12 are the LED light that can represent RGB colors.

Therefore, the refrigerator according to an embodiment of the present disclosure can achieve various lighting effects based on the arrangement of the light sources. In addition, there is an advantage that various information related to the refrigerator can be displayed by utilizing the same. Hereinafter, an embodiment for displaying the various information will be described in detail.

Figure 13A:
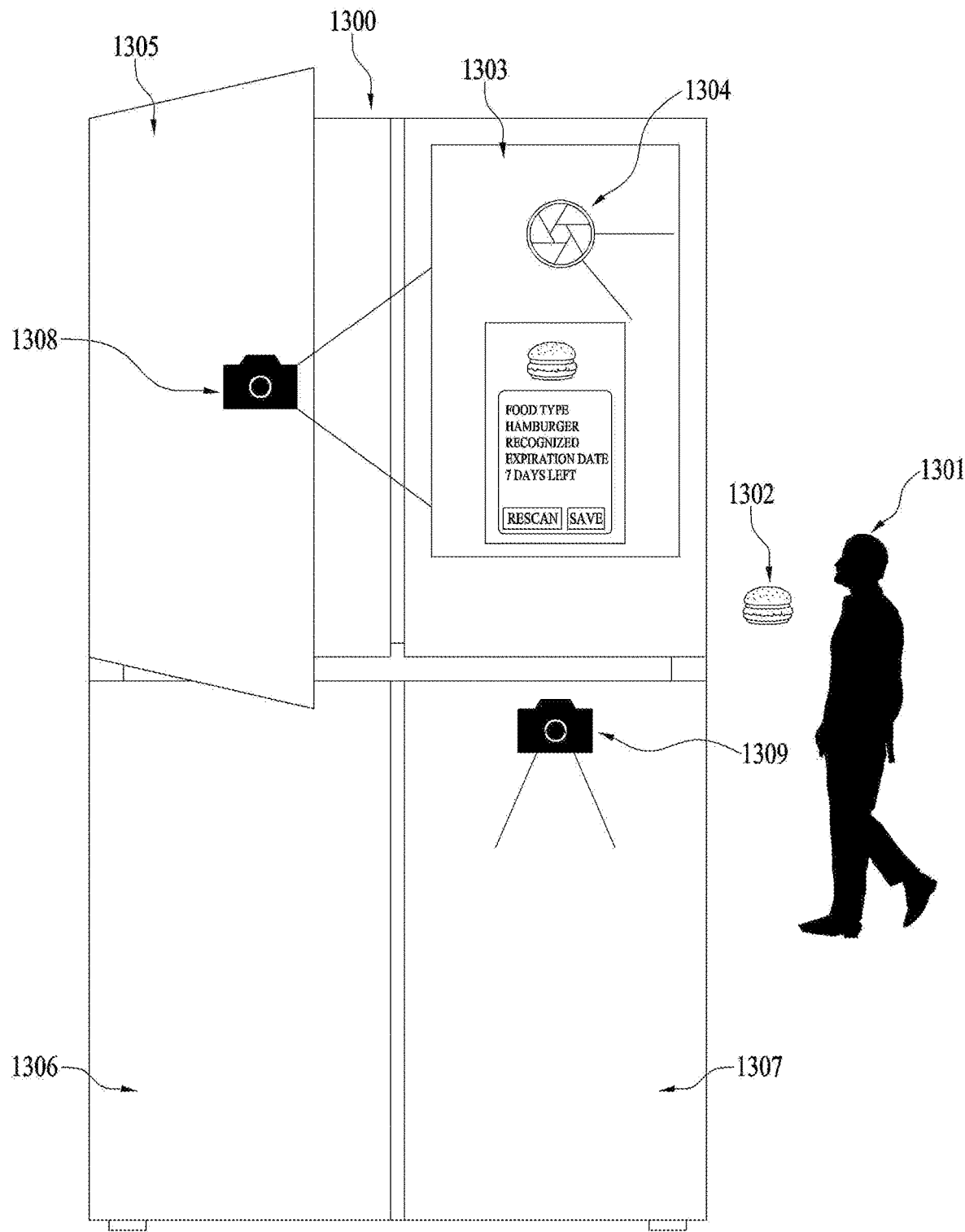
FIGS. 13a and 13b are views for illustrating a method for recognizing food in a refrigerator according to an embodiment of the present disclosure.
Figure 13B:
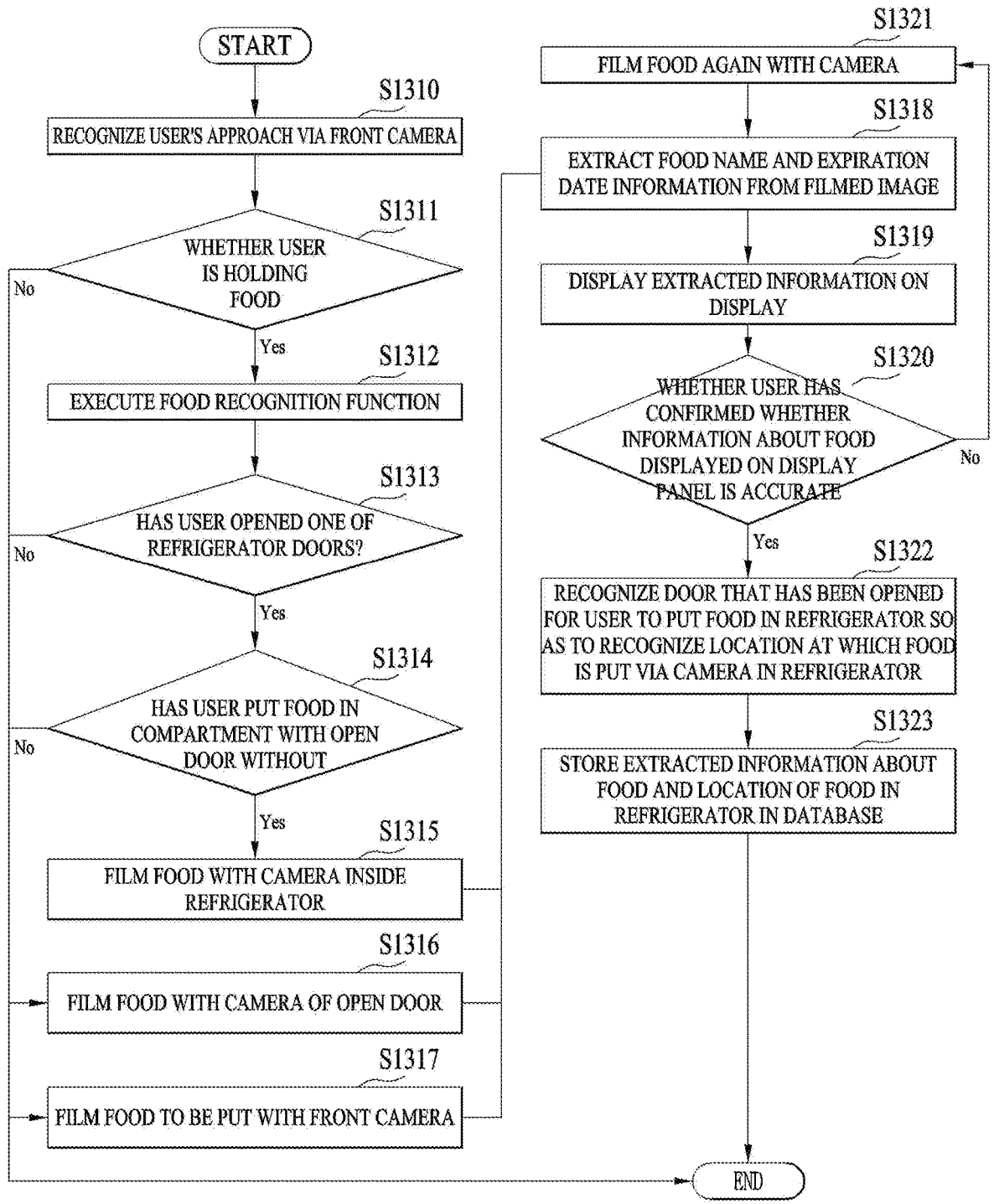

FIGS. 13a and 13b are views for illustrating a method for recognizing food in a refrigerator according to an embodiment of the present disclosure. Hereinafter, descriptions duplicate with those of the above drawings will be omitted.

That is, in order to display the various information related to the refrigerator by changing the color of the LED door according to the above-described embodiment, the refrigerator needs to first recognize information about food stored in the refrigerator.

FIG. 13a shows a scene of use by an actual user, and FIG. 13B shows a flowchart for recognizing the food in the refrigerator.

Referring to FIG. 13a, a user 1301 can approach a refrigerator 1300 holding food 1302. In one embodiment, a display door 1303, which is an upper right door of the refrigerator, can include a front camera 1304. The front camera 1304 can sense that the user 1301 approaches the refrigerator 1300 with the food 1302.

In one embodiment of the present disclosure, the refrigerator 1300 can include the front camera 1304 on the display door 1303, and at least one of a first door 1305, a second door 1306, and a third door 1307 can include a camera 1308 and can include an internal camera 1309 that films an interior of the refrigerator.

In this regard, the refrigerator 1300 can include a camera for filming the food. At least one camera can be included in the display door 1303, the first door 1305, the second door 1306, the third door 1307, and the refrigerator 1300.

That is, in the embodiment in FIG. 13a, the front camera 1304 disposed on the display door 103, the door camera 1308 disposed on the first door 1305, and the internal camera 1309 disposed in a refrigerator compartment corresponding to the third door 1307 are shown, but this is only an option. A camera for filming the food can be optionally disposed.

Thereafter, the refrigerator according to an embodiment of the present disclosure can recognize the food based on a flow in FIG. 13b.

Referring to FIG. 13b, in operation (S1310), the refrigerator can recognize the user's approach via the front camera disposed on the display door.

In operation (S1311), the refrigerator can determine whether the user is holding the food in an image recognized via the front camera. In this regard, the display door of the refrigerator can include the front camera. In this regard, when the user is not holding the food, the flow ends.

When the user is holding the food in the image recognized via the camera, in operation (S1312), the refrigerator can execute a food recognition function via the display door.

In operation (S1313), the refrigerator can determine whether the user has opened one of the refrigerator doors. The refrigerator according to one embodiment of the present disclosure can include the Android-applied display door and three LED doors having the LEDs as the light sources. The refrigerator can determine which door among the display door, the first door, the second door, and the third door the user has opened.

When the user has not opened the refrigerator door, operation (S1317) can be performed.

When the user opens the refrigerator door, in operation (S1314), whether the user has put the food in the refrigerator compartment with the open door without the food recognition and then closed the door can be identified.

When the user has put the food into the refrigerator compartment with the open door without the food recognition and then closed the door, in operation (S1315), the food can be filmed via the camera in the refrigerator of the corresponding refrigerator compartment.

When the user has put the food in the refrigerator compartment with the open door without the food recognition and then has not closed the door, in operation (S1316), the food can be filmed via the camera of the open door. That is, in one embodiment of the present disclosure, not only the display door can be equipped with the front camera to identify whether the user is approaching, whether the user is holding the food, and information about the food, but also each door is equipped with a camera capable of filming the food while the door is opened, and the camera is also disposed inside the refrigerator to film the food in the refrigerator.

In operation (S1317), when the user has not opened the refrigerator door, the refrigerator can film the food the user is holding with the front camera.

When the food is filmed through operation (S1315) to operation (S1317), in operation (S1318), the refrigerator can extract the information about the food from the filmed image. In this regard, the information about the food can include a name of the food and expiration date information of the food.

In operation (S1319), the refrigerator can display the extracted information about the food on the display panel of the display door. Thereafter, the refrigerator can receive a user input on whether the information about the food displayed on the display panel is accurate from the user.

In operation (S1320), when the user confirms that the information about the food displayed on the display panel is accurate, operation (S1322) is performed, and when the user confirms that the information is not accurate, operation (S1321) can be performed.

When the user confirms that the information is not accurate, in operation (S1321), the food can be filmed again with the camera. In this regard, the food can be filmed via the camera in operation (S1315) to operation (S1317).

In addition, when the user determines that the information about the food is not accurate even though operation (S1320) and operation (S1321) are repeatedly performed, the user can directly input the information about the food via the display panel.

When the user confirms that the information about the food output on the display panel is accurate, in operation (S1322), the door that has been opened for the user to put the food in the refrigerator can be recognized, so that a location at which the food is put can be recognized via the camera in the refrigerator of the corresponding door.

In operation (S1323), the information about the food and the location of the food in the refrigerator can be stored in a database of the food.

An embodiment to be described later can be illustrated based on the information about the food and the location of the food in the refrigerator recognized through FIGS. 13a and 13b.

FIG. 14 is a view for illustrating a food management user interface of a refrigerator according to an embodiment of the present disclosure. Hereinafter, descriptions duplicate with those of the above drawings will be omitted.

Because a refrigerator 1400 of one embodiment of the present disclosure includes a display door having a display panel 1401 capable of outputting a content, various information can be output via the display panel 1401.

Accordingly, the present disclosure is to provide a food management user interface that is mapped with structures of refrigerator storage compartments such that it can be cognitively easy to understand the interface, and a state of the food and a storage amount for each storage compartment can be identified at a glance.

That is, actual arrangement and sizes of food doors and food storage compartments of the refrigerator 1400 as shown in (a) in FIG. 14 can be output via the food management user interface on the display panel 1401 as shown in (b) in FIG. 14.

In more detail, the food management user interface in (b) in FIG. 14 can output door compartments 1402a, 1402b, 1402c, and 1402d of the refrigerator 1400, and storage compartments 1403a, 1403b, 1403c, and 1403d of the refrigerator 1400 in a distinguished manner. This is a result of reflecting the fact that the user generally uses upper door compartments 1402a and 1402b and storage compartments 1403a and 1403b of the refrigerator 1400 for mainly putting chilled food, and uses lower door compartments 1402c and 1402d and storage compartments 1403c and 1403d of the refrigerator 1400 for mainly putting frozen food.

In one embodiment, the refrigerator 1400 can display expiration date information 1404 of the food, an image 1405 for each food, and a food storage amount 1406 of a compartment in which the corresponding food is stored via the food management user interface 1401.

To this end, the refrigerator 1400 can display at least one food in the door compartments 1402a, 1402b, 1402c, and 1402d and the storage compartments 1403a, 1403b, 1403c, and 1403d with an indicator 1405. In the embodiment in FIG. 14, the at least one food is indicated with the circular indicator 1405. In another embodiment, the refrigerator 1400 can display the food as an image. In this regard, the image can correspond to a filmed real image or a diagrammed virtual image.

In addition, the refrigerator 1400 can output the expiration date information 1404 of the food via the food management user interface 1401. In one embodiment, the refrigerator 1400 can output the expiration date information 1404 of the food by changing a color. Because the refrigerator 1400 stores the expiration date information for the food in the database according to the above-described embodiment, the refrigerator 1400 can determine food with an upcoming expiration date and food that had passed an expiration date thereof via comparison with a current date.

Accordingly, the refrigerator 1400 can output indicators of the food with the upcoming expiration date and the food that had passed the expiration date thereof with different colors. For example, the refrigerator 1400 can display an indicator 1404 of the food with the upcoming expiration date in yellow, and display an indicator 1404 of the food that had passed the expiration date thereof in red. Accordingly, the user can directly know which food in which compartment has an upcoming expiration date and had passed the expiration date.

In addition, the refrigerator 1400 can display a food storage amount 1406 of the compartment where the food is stored. In this regard, the food storage amount 1406 can be output as an indicator 1406 in a form of a progress bar. More specifically, the food storage amount 1406 corresponds to a value of a percentage (%) unit obtained by dividing an amount of food stored in the door compartments 1402a, 1402b, 1402c, and 1402d and the storage compartments 1403a, 1403b, 1403c, and 1403d by compartment units.

For example, when the amount of food stored in an upper right door compartment 1402b of the refrigerator 1400 is 80%. the refrigerator 1400 can notify the user of the amount of food via the storage amount indicator 1406. In this regard, the storage amount indicator 1406 can indicate 80%.

That is, the user can intuitively know the expiration date information of the food and the information on the amount of food stored in each compartment via the food management user interface 1401 being output on the display panel 1401.

Parts (a) and (b) in FIG. 15a are views for illustrating an embodiment of changing a door color based on food freshness in a refrigerator according to an embodiment of the present disclosure. Hereinafter, descriptions duplicate with those of the above drawings will be omitted.

Referring to part (a) in FIG. 15a, a refrigerator 1500 can recognize food via one or more cameras 1500a, 1500b, 1500c, and 1500d included in the refrigerator 1500, and can store a location and expiration date information of the food in a database according to the above-described embodiment. In this regard, locations of the one or more cameras 1500a, 1500b, 1500c, and 1500d are merely an example. The one or more cameras 1500a, 1500b, 1500c, and 1500d can be installed at different locations for accurately identifying the location of the food.

Referring to part (b) in FIG. 15a, the refrigerator 1500 can change a color of at least one of a first door 1501, a second door 1502, and a third door 1503 based on the expiration date of the food stored in the refrigerator 1500.

More specifically, when food with a period equal to or greater than a first period (e.g., one week) left until the expiration date is stored in the first door 1501, the refrigerator 1500 can change a color of the first door 1501 to a first color (e.g., green). This is a result obtained as the refrigerator 1500 sets light output from a light source located at a lower end of the first door 1501 in green. This has been described with reference to the above-described drawings.

In addition, when food with a period smaller than the first period left until the expiration date is stored in the second door 1502, the refrigerator 1500 can change a color of the second door 1502 to a second color (e.g., yellow).

Similarly, when food that had passed an expiration date thereof is stored in the third door 1503, the refrigerator 1500 can change a color of the third door 1503 to a third color (e.g., red).

In one embodiment, the refrigerator 1500 can change the first period, the first color, the second color, and the third color based on user settings. In addition, the first period, the first color, the second color, and the third color can be determined at a time of manufacture.

That is, a color of a door of a compartment with the food with the upcoming expiration date can be changed to a caution color, and a color of a door of a compartment with the food that had passed the expiration date can be changed to a warning color. Therefore, the user can easily identify the expiration date information.

In addition, in one embodiment, the location of the food with the upcoming expiration date or the food that had passed the expiration date can be indicated more specifically. Referring to (c) in FIG. 15a, when the food that had passed the expiration date is stored in the third door 1503, the refrigerator 1500 can specifically change only a color of a region where the food is located. That is, when the food that had passed the expiration date is stored at a first location 1504 of the third door 1503, the refrigerator 1500 can change the color of the third door 1503 to the first color, and change a color of the first location 1504 to the third color.

In addition, when only the color of the door is changed, the user is not able to know with certainty whether the food that had passed the expiration date is in the door compartment or in the storage compartment. For distinguishment, referring to (d) in FIG. 15a, when the food that had passed the expiration date is stored in the first door 1501, the refrigerator 1500 can change the color of an entirety of the first door 1501 to the first color, but change a color of a second location 1505 to the third color as shown in (c) in FIG. 15a.

Thereafter, when the food that had passed the expiration date is stored in the door compartment of the first door 1501, the refrigerator 1500 can output an indicator that blinks once at the second location 1505 of the first door 1501. On the other hand, when the food that had passed the expiration date is stored in the storage compartment of the first door 1501, the refrigerator 1500 can output an indicator that blinks twice at the second location 1505 of the first door 1501. The output of such a blinking indicator is applicable when the light source has the direct-type structure.

Figure 15B:
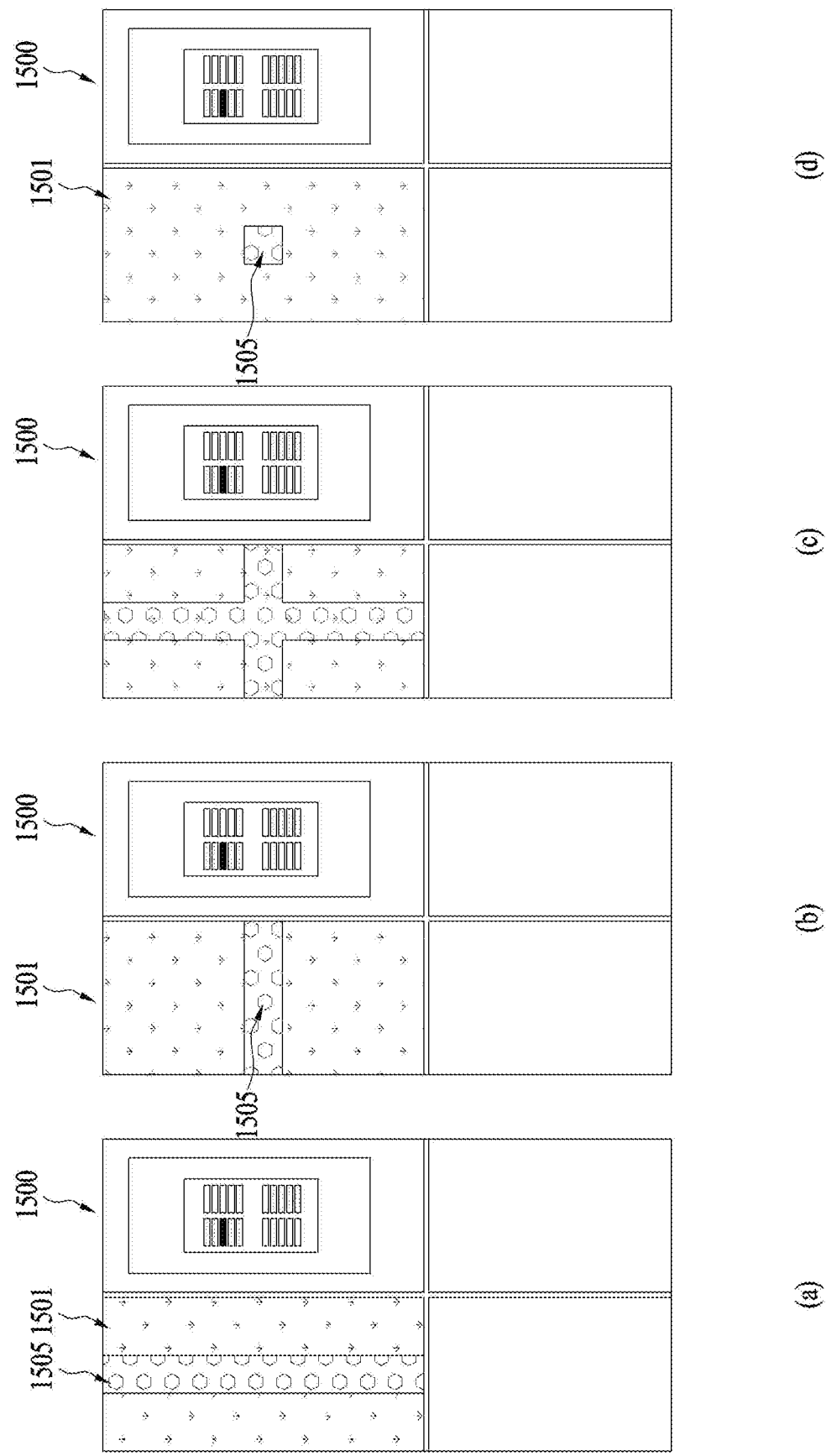
FIG. 15a, including parts (a)-(d), and FIG. 15b, including parts (a)-(d), are views for illustrating an embodiment of changing a door color based on food freshness in a refrigerator according to an embodiment of the present disclosure.

In addition, referring to (a) in FIG. 15b, when the food that had passed the expiration date is located at the second location 1505 of the first door 1501, the refrigerator 1500 can output light of a darker color at the second location 1505 as days pass after the expiration date.

As described above in FIG. 12, light sources of a door of the refrigerator 1500 according to an embodiment of the present disclosure can be arranged in one of a lower edge-type, a side edge-type, a lower and side edges-type, and a direct-type structures. Accordingly, the refrigerator 1500 can output a different color only in a partial region by adjusting the light sources. This will be described once more with reference to FIG. 15B. In addition, (b) to (d) in FIG. 15b all assume that the food that had passed the expiration date is located at the second location 1505 of the first door 1501 of the refrigerator 1500.

Part (b) in FIG. 15b is a view showing the location of the food that had passed the expiration date when using the side edge-type light source structure, (c) in FIG. is a view showing the location of the food that had passed the expiration date when using the lower and side edges-type light source structure, and (d) in FIG. 15B is a view showing the location of the food that had passed the expiration date when using the direct-type light source structure.

In addition, the display door including the display panel rather than the door including the LED light source of the refrigerator 1500 can output the food management user interface as described above in FIG. 14. A description thereof will be omitted.

Figure 16A:
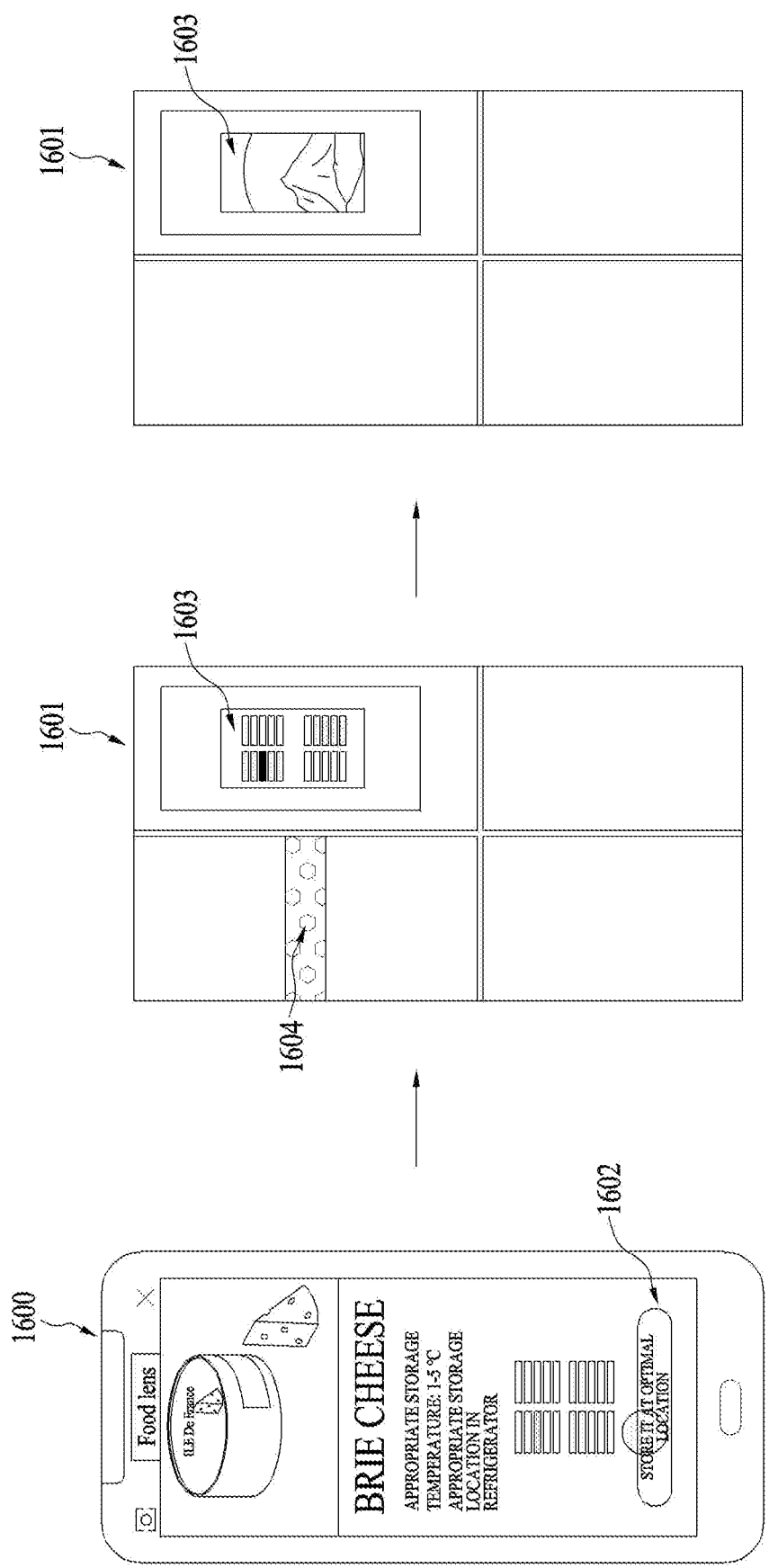

FIGS. 16a and 16b are views for illustrating an embodiment of providing a recommended location of food in a refrigerator according to an embodiment of the present disclosure. Hereinafter, descriptions duplicate with those of the above drawings will be omitted.

In this regard, it is assumed that a user terminal 1600 and a refrigerator 1601 are connected to each other. In addition, the user can request an optimal location of food via the user terminal 1600.

More specifically, the user terminal 1600 can input information about the food to be put into the refrigerator 1601 in advance via an application in a state of being connected to the refrigerator 1601. This is the same as described above with reference to FIGS. 13a and 13b. However, unlike FIGS. 13a and 13b, the user can input the information about the food via a camera included in the user terminal 1600 and transmit the information to the refrigerator 1601 via the application.

In one embodiment of the present disclosure, at least one of the user terminal 1600 and the refrigerator 1601 can provide the optimal location of the food to the user based on the received information about the food.

More specifically, referring to a first view in FIG. 16a, the user terminal 1600 can output the information about the food on a display and output an appropriate storage location 1602 in the refrigerator 1601 at the same time.

In this regard, the optimal storage location or the appropriate storage location of the food can be determined based on at least one of a temperature of each compartment of the refrigerator 1601, a degree of congestion of each compartment, whether there is similar food in the compartment of the refrigerator 1601, an odor or a characteristic of the food to be currently put, an odor or a characteristic of food existing in the refrigerator 1601, and a freshness of the food. This can be determined via an algorithm by the user terminal 1600, can be determined by receiving a result for the algorithm determined by the refrigerator 1601 or can be received from another connected external server.

The user terminal 1600 can transmit the optimal location of the food to the refrigerator 1601 when receiving a signal of selecting an icon 1602 of storage at optimal location. In this regard, when the user terminal 1600 determines the optimal location of the food as described above, the optimal location of the food can be transmitted to the refrigerator 1601, but the refrigerator 1601 can also determine the optimal location of the food by itself.

Referring to a second view in FIG. 16a, the refrigerator 1601 can output the determined optimal location of the food to a partial region 1604 of the display door and the LED door.

More specifically, when the determined optimal location of the food is a third compartment from the top of the first door, the refrigerator 1601 can indicate, via a food management user interface on a display panel 1603 of the display door, that it is most appropriate to store the corresponding food in the third compartment from the top of the first door.

In addition, the refrigerator 1601 can inform the user that it is most appropriate to put the food at the corresponding location by turning on light of an LED located in the third compartment from the top of the first door.

When the user properly arranges the food after opening the door of the refrigerator 1601, referring to a third view in FIG. 16a, the refrigerator 1601 can show the inside of the refrigerator 1601 to the user by switching a mode of the display panel 1603 to a transparent mode.

Hereinafter, a case in which the user does not store the food at the appropriate location will be described.

Referring to a first view in FIG. 16b, the refrigerator 1601 can recognize the location of the food in the refrigerator 1601 via at least one camera in the refrigerator 1601. In one embodiment, the refrigerator 1601 can analyze the information about the food at a time when the food is put into the refrigerator, analyze environmental change information of a current compartment, and analyze environmental change information of a surrounding compartment. In this regard, the display panel 1603 can correspond to the transparent mode.

When a location change is required for the optimal/appropriate location of the food as a result of the analysis, the refrigerator 1601 can provide a notification to the user using the display panel 1603 and the light source of the door. More specifically, a second view in FIG. 16b shows an embodiment of recommending moving food A in a display door compartment to a second door compartment, and a third view in FIG. 16b shows an embodiment of recommending moving food B in a first door compartment to the display door compartment.

In more detail, referring to a second drawing in FIG. 16b, when it is determined that it is more appropriate to move the food A in the display door compartment to the compartment of the second door, the refrigerator 1601 can switch the mode of the display panel 1603 to a translucent mode. Thereafter, the refrigerator 1601 can output an indicator 1604 indicating the food A on the display panel 1603, and further output a first arrow indicator 1605 indicating the optimal location. In addition, the refrigerator 1601 can output a text "Food A is better to keep frozen" on the display panel 1603. This is because the second door is an appropriate compartment for storing the frozen food.

In addition, in one embodiment, the refrigerator 1601 can turn on light of a light source corresponding to a first compartment 1606 of the second door where the optimal location of the food A is located. Accordingly, the user can know that the optimal location of the food A is not the display door compartment, but the first compartment 1606 of the second door.

In another embodiment, referring to the third view in FIG. 16b, when it is determined that it is more appropriate to move the food B in a second compartment 1607 of the first door to the compartment of the display door, the refrigerator 1601 can turn on light of a light source corresponding to the second compartment 1607 of the first door. Thereafter, the refrigerator 1601 can switch the mode of the display panel 1603 to the translucent mode, and output an indicator 1608 indicating the optimal location of the food B on the display panel 1603. Similarly, the refrigerator 1601 can further output a second arrow indicator 1609 indicating the optimal location of the food B. In addition, the refrigerator 1601 can output a text "It is better to keep food B here" on the display panel 1603.

Accordingly, the user can know that the compartment of the display door indicated by the indicator 1608 and the second arrow indicator 1609 is a more appropriate location for the food B than the second compartment 1607 of the first door.

Figure 17:
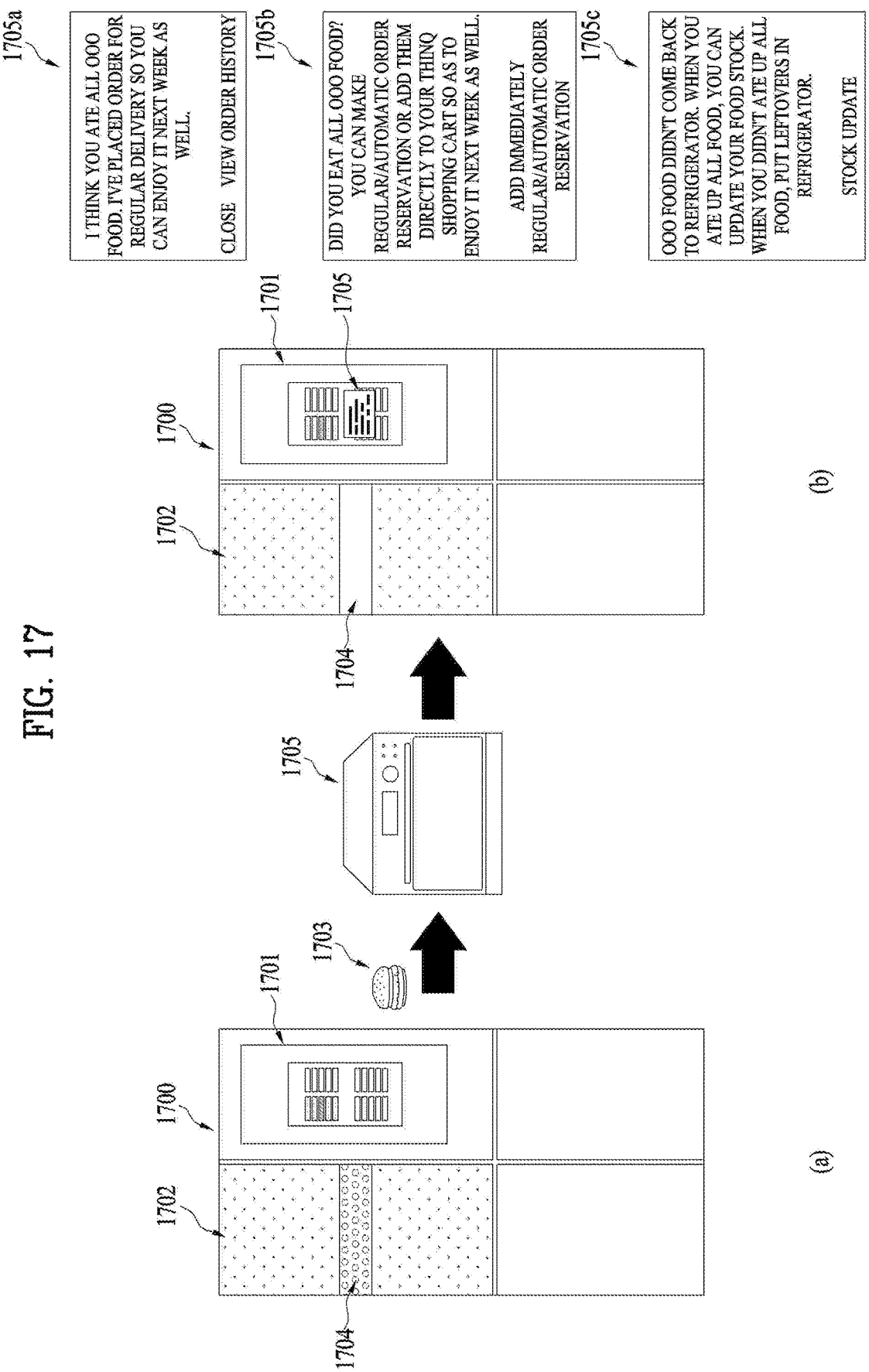
FIG. 17, including parts (a) and (b), is a view for illustrating an update embodiment based on whether food has been withdrawn from a refrigerator according to an embodiment of the present disclosure.

FIG. 17 is a view for illustrating an update embodiment based on whether food has been withdrawn from a refrigerator according to an embodiment of the present disclosure. Hereinafter, descriptions duplicate with those of the above drawings will be omitted.

Referring to part (a) in FIG. 17, as described above, a refrigerator 1700 can output food currently in the refrigerator and expiration date information via the product management user interface on a display door 1701, and can turn on light of a light source corresponding to a first door 1702 to notify the user of the food and the expiration date information of the food stored in a compartment of the first door 1702.

In this regard, the refrigerator 1700 can indicate a location 1704 of first food 1703 with an upcoming expiration date in a first color. Thereafter, when the first food 1703 is withdrawn out of the refrigerator 1700, the refrigerator 1700 can update a total stock in the refrigerator 1700 via an internal camera.

In addition, when the refrigerator 1700 is connected to a cooking appliance 1705, the refrigerator 1700 can receive a cooking result of the food from the cooking appliance 1705. More specifically, the refrigerator 1700 and the cooking appliance 1705 can transmit and receive information to and from each other via the same network such as Wi-Fi. When the cooking appliance 1705 cooks the first food 1703 withdrawn from the refrigerator 1700, the cooking result of the first food 1703 can be transmitted to a server connected with the refrigerator 1700, and can be updated in the refrigerator 1700.

After the cooking is completed, when the user approaches the refrigerator 1700, referring to part (b) in FIG. 17, the refrigerator 1700 can output an updated food management user interface via a display panel 1701, and indicate a location 1704 of the food of the first door 1702 in a second color.

In addition, when all of the first food 1703 is withdrawn and is out of stock, the refrigerator 1700 can output a pop-up window 1705 via the display panel 1701. In this regard, the pop-up window 1705 can output information received from a server.

For example, the first food 1703 can correspond to food for which a regular or automatic order is reserved. In this case, the refrigerator 1700 can output a first pop-up window 1705a on the display panel 1701.

In this regard, because the regular or automatic order of the first food 1703 is reserved, the first pop-up window 1705a can output a "close" icon and a "view order history" icon with a text indicating that the regular delivery order has been completed. In this regard, when the user selects the "view order history" icon, the refrigerator 1700 can provide an order history of the first food 1703 received from the server via the display panel 1701.

In another example, the first food 1703 can correspond to food for which the regular or automatic order is not reserved. In this case, the refrigerator 1700 can output a second pop-up window 1705b on the display panel 1701.

In this regard, because the regular or automatic order of the first food 1703 is not reserved, the second pop-up window 1705b can output icons of "add immediately" and "regular/automatic order reservation" with a text recommending to reserve the regular or automatic order. In this regard, when the user selects the "add immediately" and "regular/automatic order reservation" icons, the refrigerator 1700 can directly add the first food 1703 to a shopping cart via an application in association with the refrigerator 1700 or can provide a service of reserving the regular or automatic order.

In another example, the refrigerator 1700 may not know whether the first food 1703 is cooked. In this case, the refrigerator 1700 can output a third pop-up window 1705c on the display panel 1701.

In this regard, when whether the first food 1703 is cooked is not able to be known, the refrigerator 1700 can identify whether to update the stock of the first food 1703 from the user via the third pop-up window 1705c. That is, the third pop-up window 1705c can include a "close" icon and a "stock update" icon, and when the user selects the "stock update" icon, the refrigerator 1700 can manually update the stock of the first food 1703.

Figure 18:
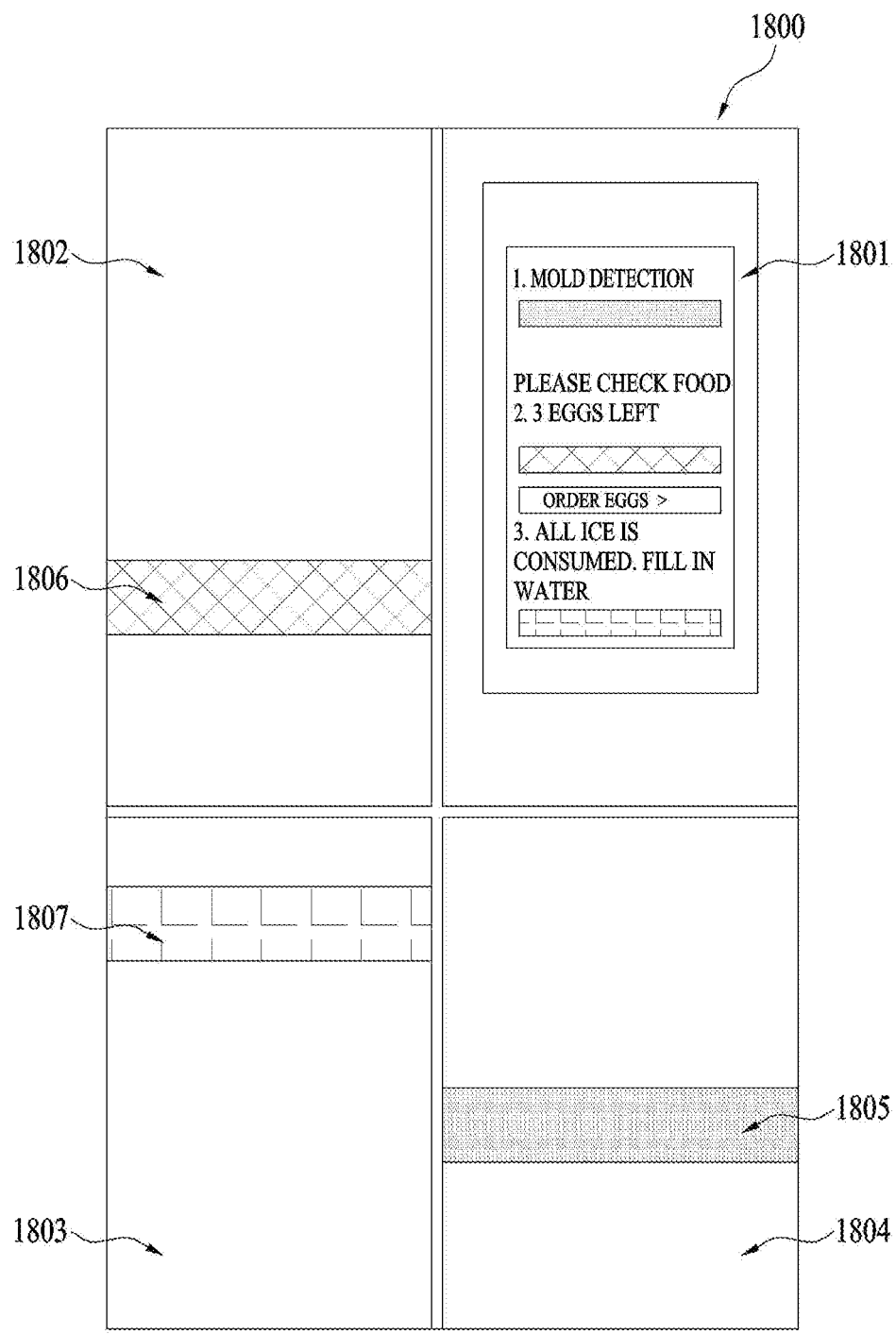
FIG. 18 illustrates an embodiment of outputting a notification for each location based on an event occurring in a refrigerator according to an embodiment of the present disclosure.

FIG. 18 illustrates an embodiment of outputting a notification for each location based on an event occurring in a refrigerator according to an embodiment of the present disclosure. Hereinafter, descriptions duplicate with those of the above drawings will be omitted.

Referring to FIG. 18, a refrigerator 1800 can include a display door including a display panel 1801, and each of a first door 1802, a second door 1803, and a third door 1804 capable of outputting light to a partial region thereof via an LED light source.

In one embodiment of the present disclosure, the refrigerator 1800 can notify a sanitary state and whether food is consumed for each refrigerator compartment via at least one of the display panel 1801, the first door 1802, the second door 1803, and the third door 1804.

In more detail, the refrigerator 1800 can identify the sanitary state and whether food is consumed for each compartment in the refrigerator via an internal camera.

For example, when mold occurs in the first food stored in a first compartment 1805 of the third door 1804, the refrigerator 1800 can notify that the mold has been sensed in the first food stored in the first compartment 1805 of the third door 1804 via the display panel 1801. In addition, the refrigerator 1800 can irradiate light of a first color (e.g., black) related to the mold in the first compartment 1805 of the third door 1804 from a light source, so that the first compartment 1805 of the third door 1804 can emit light in the first color.

In addition, in another example, when a change in a total stock of second food stored in a second compartment 1806 of the first door 1802 occurs, the refrigerator 1800 can notify the total stock of the second food stored in the second compartment 1806 of the first door 1802 via the display panel 1801. In addition, when the second food is food with the regular/automatic order, the refrigerator 1800 can provide an order service of the second food. In addition, the refrigerator 1800 can irradiate light of a second color (e.g., yellow, when the second food is an egg) related to the second food in the second compartment 1806 of the first door 1802 from a light source, so that the second compartment 1806 of the first door 1802 can emit light in the second color.

In addition, in another example, when all ice in a third compartment 1807 of the second door 1803 is consumed, the refrigerator 1800 can notify that all the ice stored in the third compartment 1807 of the second door 1803 is consumed via the display panel 1801. In particular, the refrigerator 1800 can give a notification to fill in water when all the ice is consumed. In this regard, the refrigerator 1800 can irradiate light of a third color (e.g., blue) related to the ice in the third compartment 1807 of the second door 1803 from a light source, so that the third compartment 1807 of the second door 1803 can emit light in the third color.

Figure 19B:
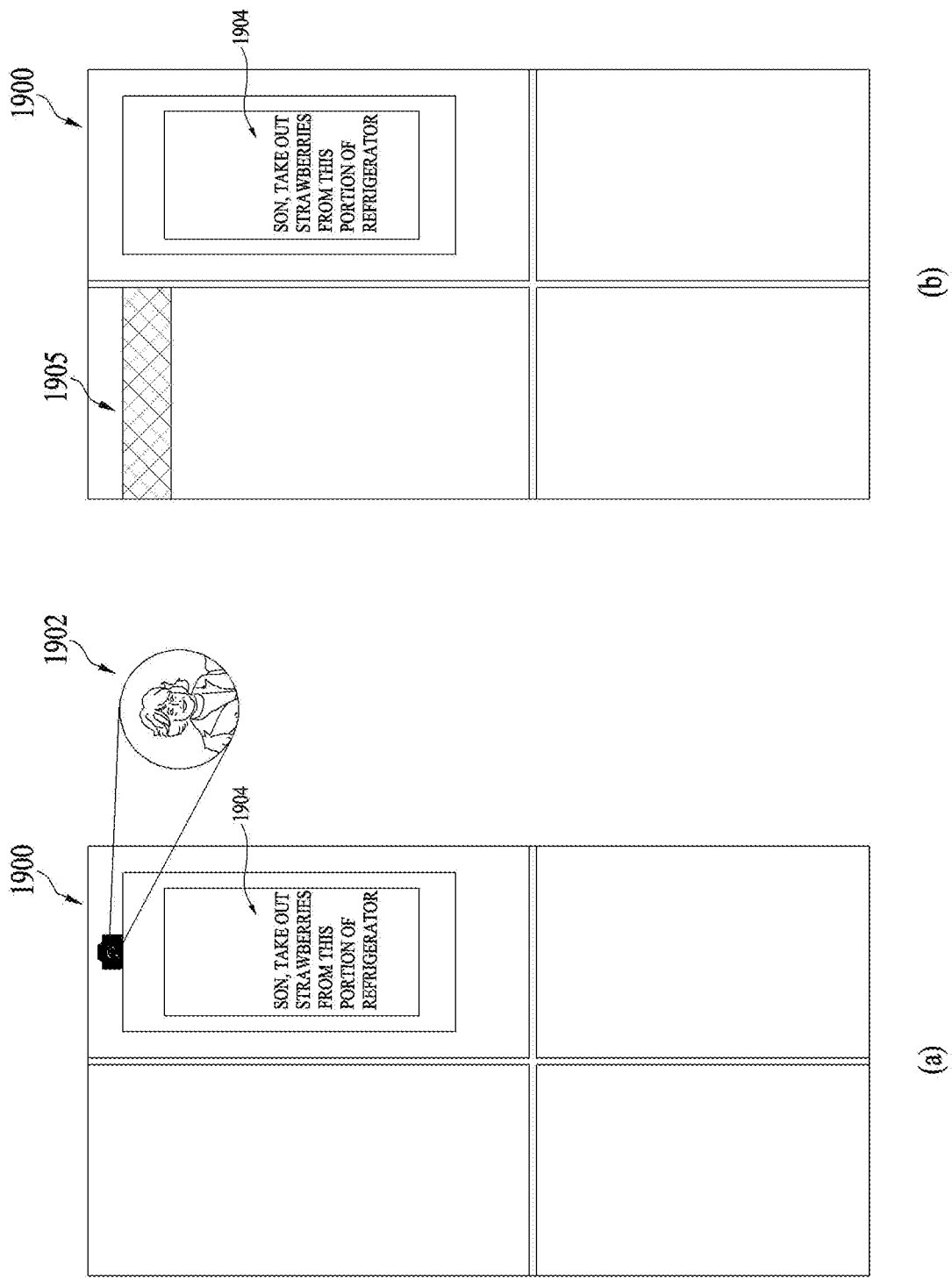
FIG. 19a, including parts (a) and (b), and FIG. 19b, including parts (a) and (b), are views for illustrating an embodiment of guiding a location of food by recognizing a face in a refrigerator according to an embodiment of the present disclosure.

FIGS. 19*a* and 19*b* are views for illustrating an embodiment of guiding a location of food by recognizing a face in a refrigerator according to an embodiment of the present disclosure. Hereinafter, descriptions duplicate with those of the above drawings will be omitted.

Referring to (a) in FIG. 19*a*, a refrigerator 1900 can recognize at least one face via a front camera, map a corresponding name to the recognized face, and store the mapped name and face in a database.

More specifically, the refrigerator 1900 can recognize the at least one face via a front camera included in a display door, receive a name corresponding to the recognized face via a display panel 1901, map the at least one face and the corresponding name to each other, and store the mapped face and name in the database.

For example, in a case of a family of six people, the refrigerator 1900 can recognize a grandmother's face, a mother's face, a father's face, a grandfather's face, a daughter's face, and a son's face via the front camera, receive a name corresponding to each face via the display panel 1901, map the face and the name to each other, and store the mapped face and name in the database.

Referring to (b) in FIG. 19*a*, the refrigerator 1900 can execute a memo application via the display panel 1901. Thereafter, the refrigerator 1900 can receive a name 1903 corresponding to a first face 1902 and location information 1904 about the food via the memo application. In this regard, the first face 1902 is a face registered in advance according to (a) in FIG. 19*a*.

In this regard, the refrigerator 1900 can receive the name 1903 corresponding to the first face 1902 and the information 1904 about the food using a preset drawing pen or in a specific color. For example, the name 1903 can be input in green, and the information about the food 1904 can be input in pink. Accordingly, the refrigerator 1900 can know that the name 1903 and the information 1904 about the food input to the memo application are not simply a memo, but keywords.

In one embodiment, when receiving the information 1904 about the food, the refrigerator 1900 can search for the information 1904 about the corresponding food from the internal camera of the refrigerator 1900 or an existing database, and change a color of a door compartment in which the corresponding food is located. This will be described in detail with reference to FIG. 19*b*.

Referring to (a) in FIG. 19*b*, when the first face 1902 is sensed via a front camera 1905 included in the display door, the refrigerator 1900 can change a color of a door compartment 1905 corresponding to the information 1904 about the food as shown in (b) in FIG. 19*b*.

More specifically, when the first face 1902 is the pre-registered son's face, and the information 1904 about the food is strawberries, the refrigerator 1900 can recognize that the strawberries are located in a first compartment 1905 of a first door according to the above-described embodiment. Accordingly, when the pre-registered son's face is sensed via the front camera 1905, the refrigerator 1900 can turn on pink light of a light source corresponding to the first compartment 1905 of the first door where the strawberries are located. In this regard, the refrigerator 1900 can flicker the pink light of the light source corresponding to the first compartment 1905 of the first door.

Accordingly, the user (the son) can know the location of the food even though he did not put the food into the refrigerator himself That is, the refrigerator 1900 is used by all family members, so that a person who has put the food in the refrigerator and a person who takes the food out of the refrigerator can be different from each other. When the information about the food can be stored and the location of the food can be informed via the change in the color of the door, even when the person who has put the food in the refrigerator and the person who takes the food out of the refrigerator are different from each other, the refrigerator 1900 can easily know the location of the food.

Figure 20:
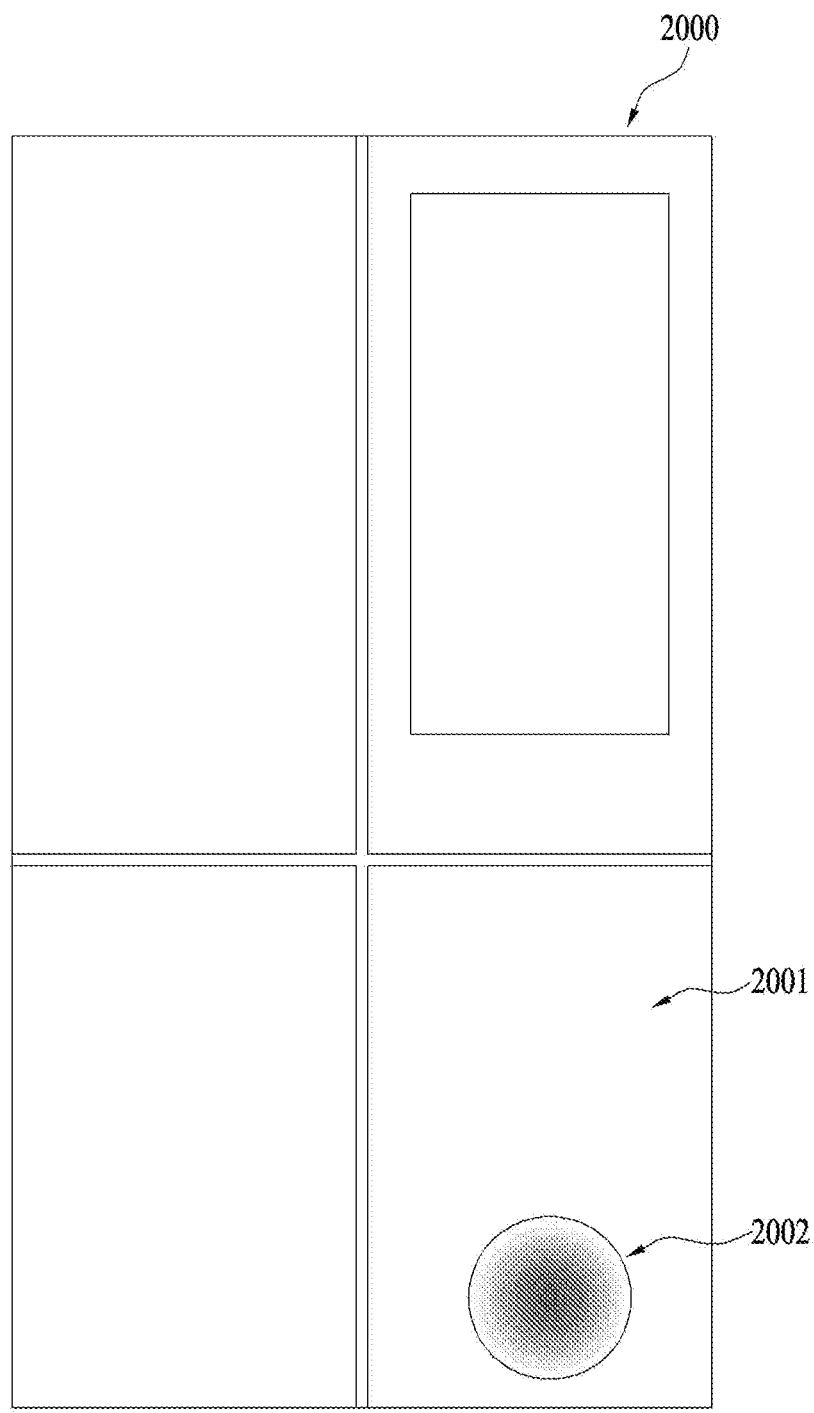
FIG. 20 is a view for illustrating an embodiment of irradiating light to a portion to which an impact was applied in a refrigerator according to an embodiment of the present disclosure.

FIG. 20 is a view for illustrating an embodiment of irradiating light to a portion to which an impact was applied in a refrigerator according to an embodiment of the present disclosure. Hereinafter, descriptions duplicate with those of the above drawings will be omitted.

In one embodiment of the present disclosure, when a great impact is applied to a specific portion of a refrigerator 2000, light of a light source corresponding to the corresponding portion can be turned on, so that the user can know the portion to which the impact was applied of the refrigerator 2000.

Referring to FIG. 20, when the impact is applied to a third door 2001, the refrigerator 2000 can turn on light of a light source corresponding to a location 2002 to which the impact is applied to the third door 2001. In one embodiment, as an intensity of the impact increases, the refrigerator 2000 can set saturation of the light of the light source corresponding to the location 2002 to which the impact is applied to be higher and increase the number of light sources that are turned on. For example, when the intensity of the impact is a first intensity, the refrigerator 2000 can output the light of the light source corresponding to the location 2002 to which the impact is applied in yellow. When the intensity of the impact is a second intensity greater than the first intensity, the refrigerator 2000 can output the light of the light source corresponding to the location 2002 to which the impact is applied in red.

A lower end of the refrigerator 2000 is a portion that children can hit while walking or accidentally kick with their feet. In this case, when the children pass by after kicking the third door 2001 of the refrigerator, the parents will not be able to know this later. Because important food can be stored at the lower end of the refrigerator 2000, the refrigerator 2000 can inform this by changing the color of the door.

Figure 21:
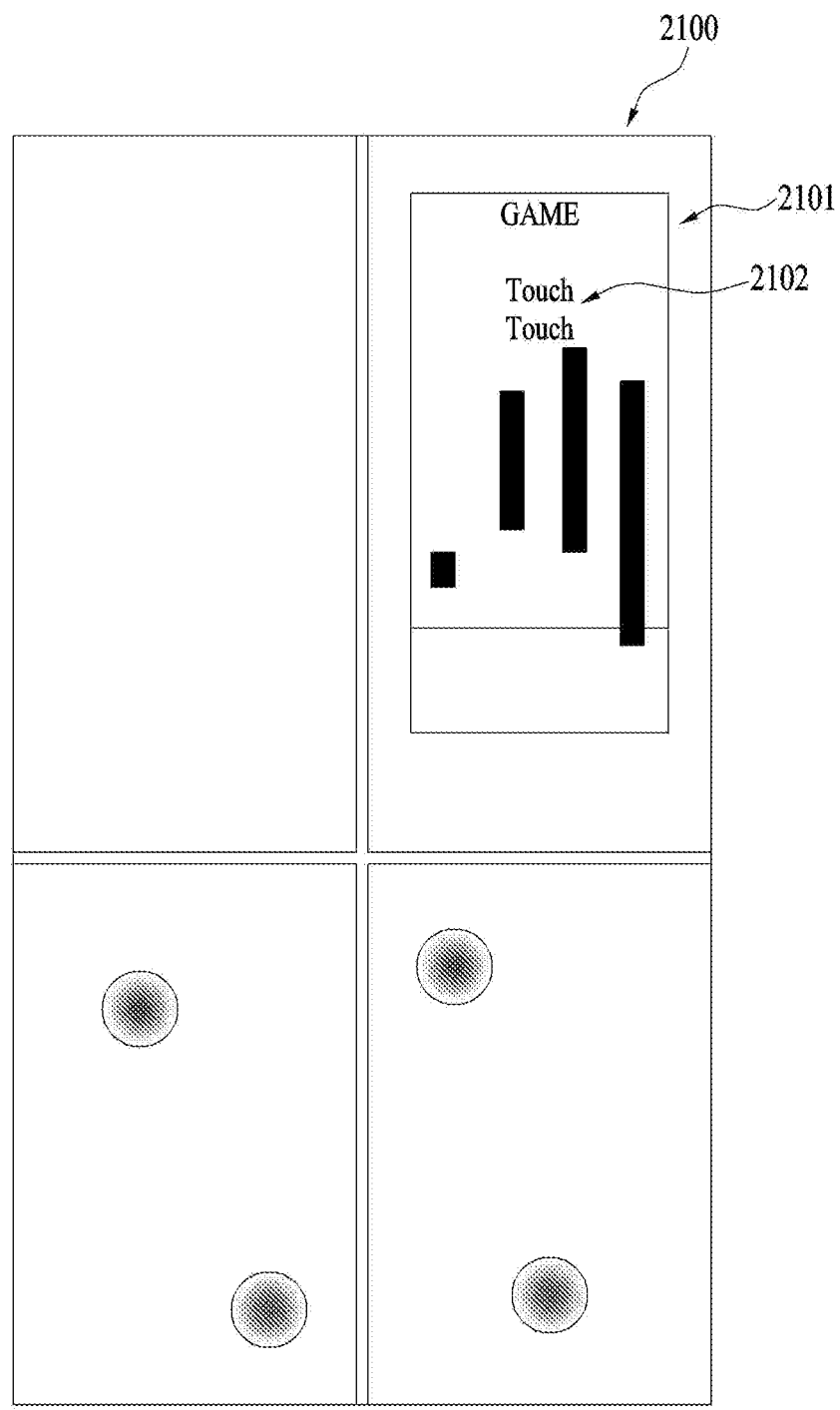
FIG. 21 is a view for illustrating an embodiment of executing a game application in a refrigerator according to an embodiment of the present disclosure.

FIG. 21 is a view for illustrating an embodiment of executing a game application in a refrigerator according to an embodiment of the present disclosure. Hereinafter, descriptions duplicate with those of the above drawings will be omitted.

Referring to FIG. 21, a refrigerator 2100 can output a game application 2102 via a display panel 2101. In this regard, the game application 2102 can correspond to a touch game application 2102 using an embodiment of changing a color of a door of the refrigerator 2100.

The refrigerator 2100 can output the game application 2102 via the display panel 2101, and turn on a light source corresponding to a portion of each of a first door, a second door, and a third door based on a color output by the game application 2102.

More specifically, in the game application 2102, a first indicator, a second indicator, a third indicator, and a fourth indicator can be output. In this regard, the refrigerator 2100 can output a first color corresponding to the first indicator in a first region of one of the first door to the third door. Similarly, the refrigerator 2100 can output a second color corresponding to the second indicator in a second region of one of the first door to the third door.

In this process, the refrigerator 2100 can output a color corresponding to the game application 2102 in the partial region of the door, thereby causing interest for the family members and increasing communication between the family members.

The various embodiments of changing the color of the door of the refrigerator have been described through the above-described drawings and the specifications. Hereinafter, an embodiment of expressing an abnormal temperature in a refrigerator via a color change of a refrigerator door will be described.

When food with a temperature equal to or higher than an appropriate temperature is put in the refrigerator, a following phenomenon occurs.

A sudden rise in an internal temperature of the refrigerator happens. The rise of the internal temperature of the refrigerator is more likely to spoil other food together. As the refrigerator is operated rapidly to lower the temperature, use of electricity increases, and moisture accumulates on a surface of the hot food, which will lead to a change in taste.

In order to solve such problem, FIGS. 22 to 27 are intended to propose an embodiment of providing a notification when food with a temperature equal to or higher than a first temperature is put in the refrigerator.

FIGS. 22 to 27 are views for illustrating an embodiment of providing a notification when food with a temperature equal to or higher than an appropriate temperature is put in a refrigerator according to an embodiment of the present disclosure. Hereinafter, descriptions duplicate with those of the above drawings will be omitted.

To this end, a refrigerator 2200 according to an embodiment of the present disclosure can include at least one temperature sensor 2201 for sensing a temperature inside the refrigerator. In this regard, the temperature detection sensor 2201 is for sensing the temperature inside the refrigerator, and there is no limit in a location of the sensor 2201.

According to one embodiment, the refrigerator 2200 can set the first temperature as the appropriate temperature of the refrigerator. In this regard, the first temperature can correspond to a temperature that affects the temperature in the refrigerator based on 25° C., which is a temperature at which the food starts to spoil. When the food with the temperature equal to or higher than the first temperature is put into the refrigerator, the refrigerator 2200 can recognize the food. When a temperature in the refrigerator of a temperature sensor that has firstly sensed the food with the temperature equal to or higher than the first temperature becomes a temperature equal to or higher than a threshold temperature, a surrounding temperature sensor can be changed in mode to a warning mode and can transmit a warning signal to the controller in advance.

Figure 22:
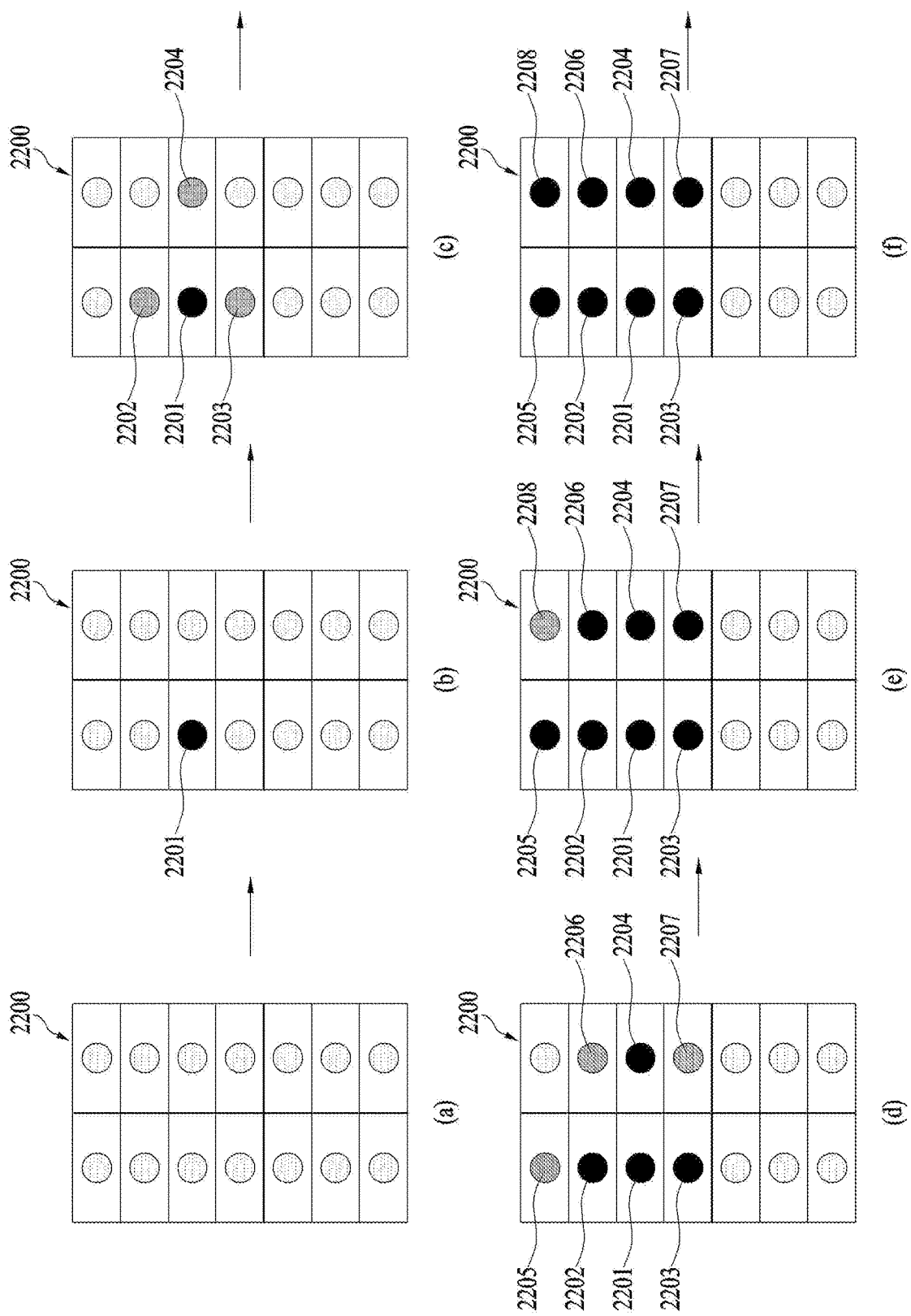
FIGS. 22 to 27 are views for illustrating an embodiment of providing a notification when food with a temperature equal to or higher than an appropriate temperature is put in a refrigerator according to an embodiment of the present disclosure.

FIG. 22 shows an embodiment in which 16 temperature sensors in a refrigerator 2200 sense a temperature inside the refrigerator.

Part (a) in FIG. 22 shows a case in which temperatures sensed by all of the temperature sensors of the refrigerator 2200 are equal to or lower than the first temperature.

Parts (b) to (f) in FIG. 22 show an embodiment over time when hot food with a temperature equal to or higher than 35° C. is put in a first compartment of the refrigerator 2200 where the first temperature sensor 2201 is located.

Part (b) in FIG. 22 shows a case in which the temperature measured by the first temperature sensor 2201 among the temperature sensors of the refrigerator 2200 is equal to or higher than the threshold temperature. For example, the threshold temperature can correspond to 10° C. from the first temperature. For example, when the temperature at which the food starts to spoil is 25° C., the refrigerator 2200 or the user can set 35° C. as the threshold temperature. In one embodiment, when the temperature measured via the first temperature sensor 2201 is equal to or higher than the threshold temperature, a notification can be transmitted to the user via a controller of the refrigerator 2200.

Referring to part (c) in FIG. 22, as the hot food is put in the first compartment of the refrigerator 2200, temperatures measured by a second temperature sensor 2202, a third temperature sensor 2203, and a fourth temperature sensor 2204 attached to surrounding compartments of the first compartment of the refrigerator 2200 become equal to or higher than the first temperature.

As time passes, referring to part (d) in FIG. 22, the temperatures measured by the second temperature sensor 2202, the third temperature sensor 2203, and the fourth temperature sensor 2204 of the refrigerator 2200 become equal to or higher than the threshold temperature, and temperatures measured by a fifth temperature sensor 2205, a sixth temperature sensor 2206, and a seventh temperature sensor 2207 disposed around the second temperature sensor 2202, the third temperature sensor 2203, and the fourth temperature sensor 2204 become equal to or higher than the first temperature.

Similarly, as more time passes, referring to part (e) in FIG. 22, temperatures measured by first to seventh temperature sensors 2201, 2202, 2203, 2204, 2205, 2206, and 2207 of the refrigerator 2200 become equal to or higher than the threshold temperature, and a temperature measured by an eighth temperature sensor 2208 in a compartment of the refrigerator 2200 close to them becomes equal to or higher than the first temperature.

As time continues to pass, the temperatures measured by all the temperature sensors 2201, 2202, 2203, 2204, 2205, 2206, 2207, and 2208 inside the refrigerator 2200 eventually become equal to or higher than the threshold temperature as shown in (f) in FIG. 22.

As such, even when the hot food with the temperature equal to or higher than the threshold temperature is put in one compartment inside the refrigerator 2200, because an entirety of the refrigerator 2200 can be affected, the refrigerator 2200 can provide a notification to the user about the food in question.

As in FIG. 22, the controller of the refrigerator can sense the change in the temperature of the refrigerator compartment by the temperature sensor attached to the inside of the refrigerator. In one embodiment of the present disclosure, in order to notify the user of the change in temperature inside the refrigerator, the light of the light source of the door of the refrigerator can be turned on.

More specifically, a color of the sensor that has firstly sensed the temperature can be expressed in the location of the corresponding refrigerator compartment. When the measured temperature is equal to or higher than the threshold temperature, a warning color can be expressed together with a gradient at a location of a nearby compartment. To this end, a light source can be disposed on a vertical surface of the LED door for color expression of a specific compartment. In addition, in another embodiment, because the display door includes the display panel, the display door can implement a color thereof without placing the light source. Hereinafter, this will be described in detail with reference to the drawings.

Figure 23:
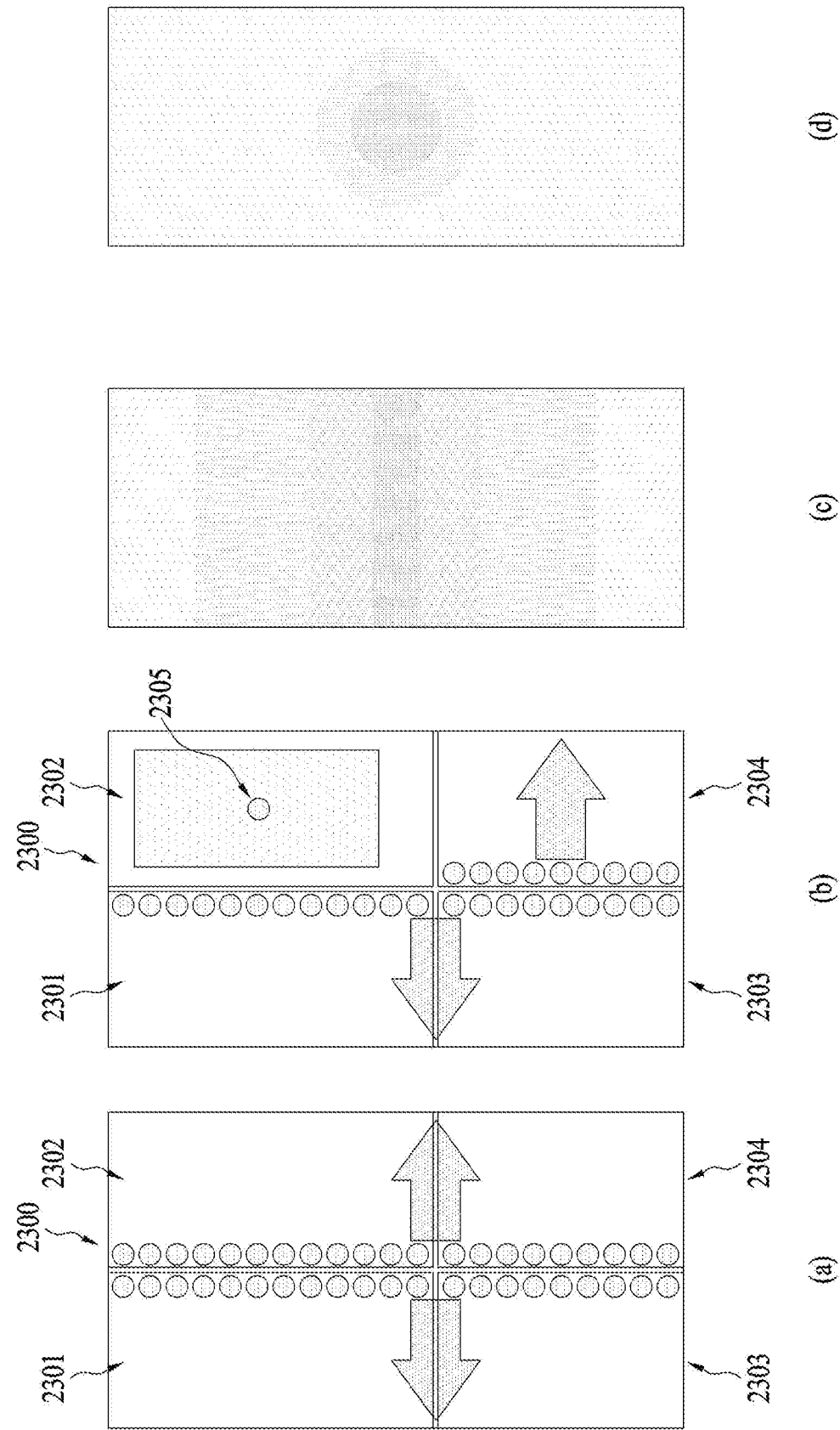

FIG. 23 is a view for illustrating a change in light based on arrangement of light sources in a refrigerator according to an embodiment of the present disclosure.

Part (a) in FIG. 23 shows an embodiment in which the light sources are vertically arranged in the LED door. When first to fourth doors 2301, 2302, 2303, and 2304 of a refrigerator 2300 are all doors in which light sources are arranged, the light sources can be arranged in a central longitudinal direction (a y-axis) of the refrigerator 2300.

According to one embodiment, in the case in which the light sources are arranged in the central longitudinal direction (the y-axis) of the refrigerator 2300, when the light sources are turned on under the control of the controller, the light is irradiated from a center of the refrigerator 2300 in the horizontal direction (an x-axis).

Part (b) in FIG. 23 shows an embodiment in which the light sources are vertically arranged in three LED doors, and only one light source is disposed at a center of one display door. The light sources are arranged in the central longitudinal direction (the y-axis) in the first door 2301, the third door 2303, and the fourth door 2304 of the refrigerator 2300.

In one embodiment, in the case in which the light sources are arranged in the central longitudinal direction (the y-axis) of the refrigerator 2300, when the light sources are turned on under the control of the controller, the light is irradiated from the center of the refrigerator 2300 in the horizontal direction (the x-axis). In this regard, as described above in FIG. 22, when the temperature equal to or higher than the threshold temperature is sensed from the temperature sensor, the controller of the refrigerator can turn on light of a light source of a door where the corresponding temperature sensor is located.

On the other hand, in a display door 2302, only one first light source 2305 can be disposed at a center of the display door 2302. In this case, when the light source is turned on under the control of the controller, the light can spread from the center of the display door 2302. This will be described again in (d) in FIG. 23.

(Part c) in FIG. 23 is a view showing one of the first door to the fourth door 2301, 2302, 2303, and 2304 in (a) in FIG. 23 and the first door 2301, the third door 2303, and the fourth door 2304 in (b) in FIG. 23, and (d) in FIG. 23 is a view showing a display door that is the second door 2302 in (b) in FIG. 23.

In the door in (c) in FIG. 23, because the light sources are arranged in the vertical direction, when the controller of the refrigerator turns on the light of the light sources, the light is irradiated in the horizontal direction. (c) in FIG. 23 shows a case in which the controller of the refrigerator turns on light of a light source located at a center among the one or more light sources arranged in the vertical direction of the door. That is, the light is irradiated in the horizontal direction at the center of the door.

In the display door in (d) in FIG. 23, because the light source is disposed at the center of the door, when the controller of the refrigerator turns on the light of the light source, the light spreads out from the center. (d) in FIG. 23 shows the case in which the controller of the refrigerator turns on the light of the light source located at the center of the door. That is, the light spreads in a circle from the center of the door.

That is, referring to the embodiments in FIGS. 22 and 23, when the temperature equal to or higher than the threshold temperature is sensed by the temperature sensor, the refrigerator can turn on light of a light source of a corresponding door to inform the user of the change in the temperature inside the refrigerator.

Figure 24:
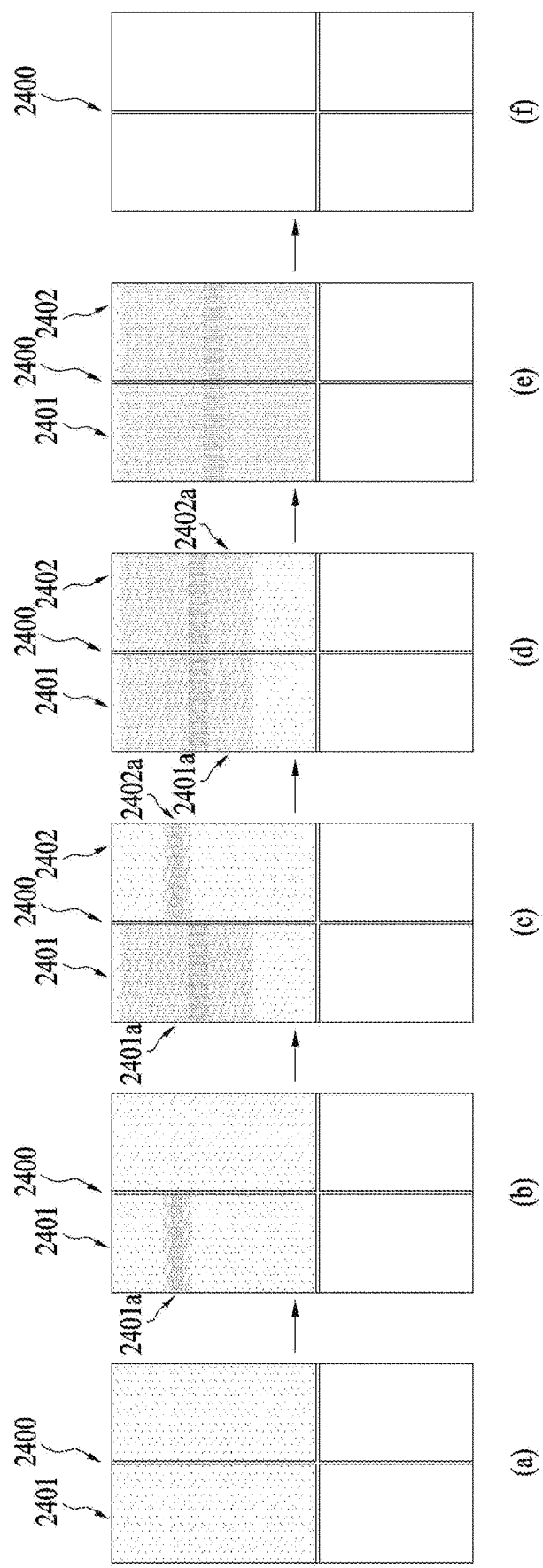

FIG. 24 is a view for illustrating a color change of a door in a refrigerator according to an embodiment of the present disclosure.

Part (a) in FIG. 24 shows a refrigerator 2400 without the temperature change.

In one embodiment, when hot food with a temperature equal to or higher than the threshold temperature is stored in a first compartment 2401a inside a first door 2401, referring to (b) in FIG. 24, the refrigerator 2400 can turn on light of a light source of the first door 2401 corresponding to the first compartment 2401a.

When a first time elapses or the temperature sensed by the surrounding temperature sensor exceeds the threshold temperature as described above in FIG. 22, referring to (c) in FIG. 24, the refrigerator 2400 can turn on light of several light sources of the first door 2401 corresponding to the first compartment 2401a and the periphery of the first compartment 2401a. That is, the refrigerator 2400 can give a gradation effect of the first door 2401 centered on the first compartment 2401a. Accordingly, the user can visually recognize that the food stored in the first compartment 2401a affects a temperature of the surrounding compartment.

In addition, the refrigerator 2400 can turn on light of a light source corresponding to a second compartment 2402a of a second door 2402 corresponding to the periphery of the first compartment 2401a. That is, when the temperature of the first compartment 2401a becomes equal to or higher than the threshold temperature, not only the temperature inside the first door 2401 can be affected, but also the temperature inside the second door 2402, which is a next compartment, can be affected. Accordingly, the refrigerator can turn on the light of the light source corresponding to the second compartment 2402a of the second door 2402.

Similarly, when a second time elapses or the temperature sensed by the surrounding temperature sensor exceeds the threshold temperature, referring to (d) in FIG. 24, the refrigerator 2400 can output the gradation effect based on the first compartment 2401a of the first door 2401 by turning on the light of the light source disposed in the first door 2401, and output the gradation effect based on the second compartment 2402a of the second door 2402 by turning on the light source disposed in the second door 2402. Accordingly, the user can recognize that the temperatures inside the first door 2401 and the second door 2402 of the refrigerator are equal to or higher than the threshold temperature.

When temperatures sensed by all temperature sensors arranged in the first door 2401 and the second door 2402 exceed the threshold temperature, referring to (e) in FIG. 24, the refrigerator 2400 can change a color of an entirety of the first door 2401 and the second door 2402 to a warning color.

When a certain time elapses, referring to (f) in FIG. 24, the refrigerator 2400 can turn off the light of the light sources arranged in all the doors 2401 and 2402. That is, according to one embodiment, when a third time elapses or the temperature inside the refrigerator 2400 is normalized, the light of the light sources arranged in all the doors 2401 and 2402 can be turned off or changed in color to an existing color.

More specifically, when the warning color is red and a default color previously set by the user is gray, when the third time elapses after performing the embodiment of parts (a) to (e) in FIG. 24, the refrigerator 2400 can change the color of all the doors to the gray previously set by the user.

In addition, in another embodiment, the refrigerator 2400 can flicker the warning color and then change the color of all the doors to the existing color.

Figure 25:
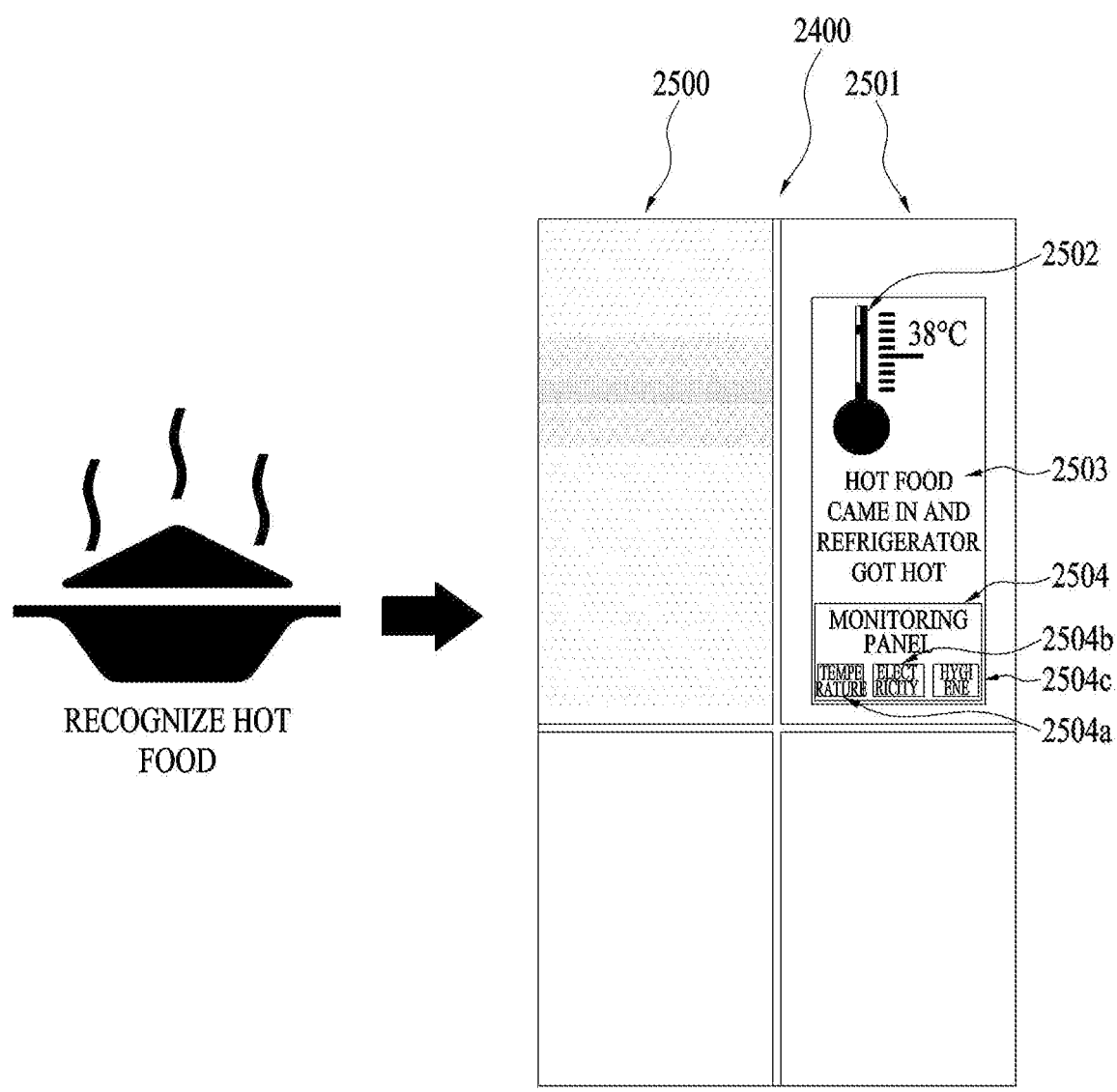
Figure 26:
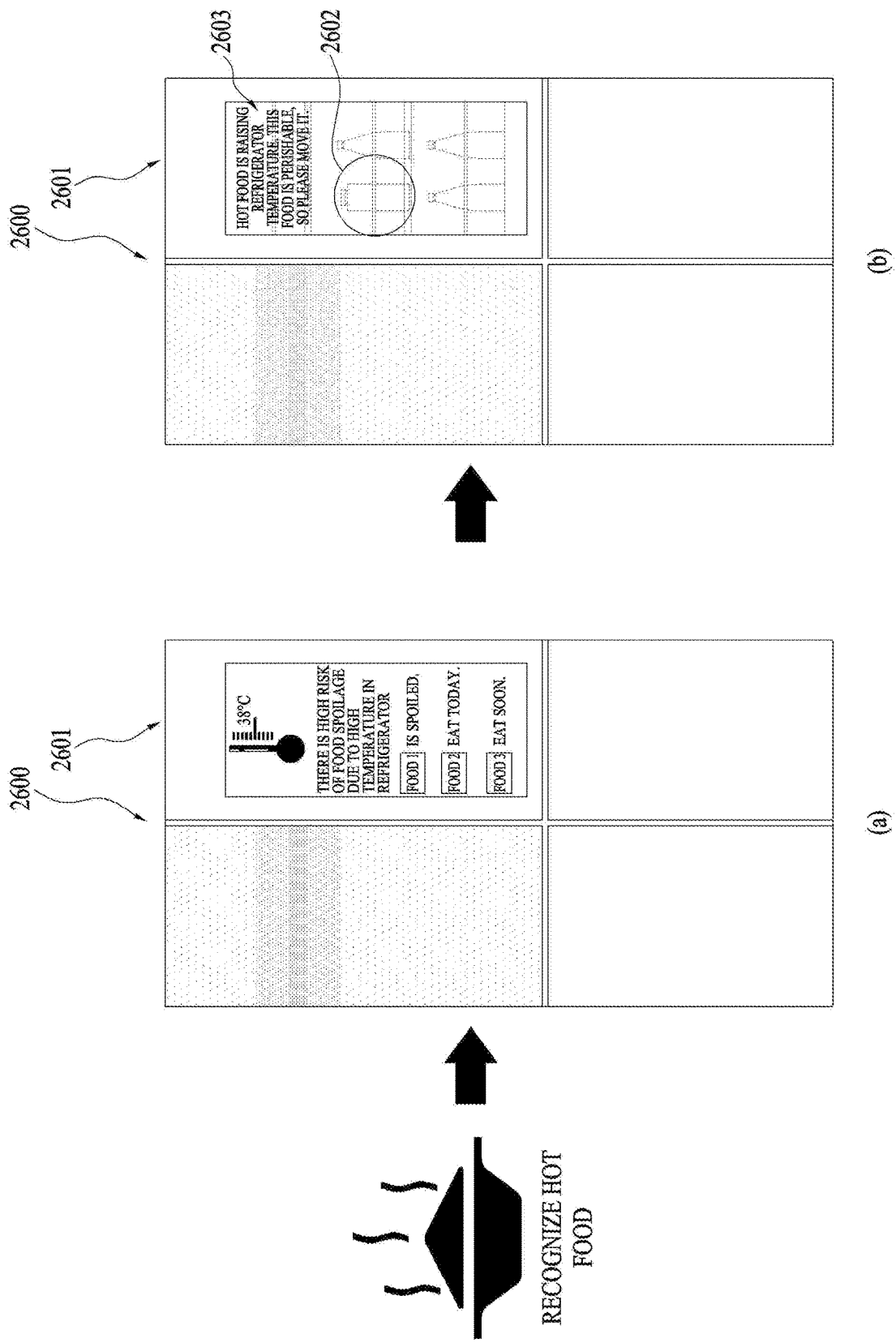
Figure 27:
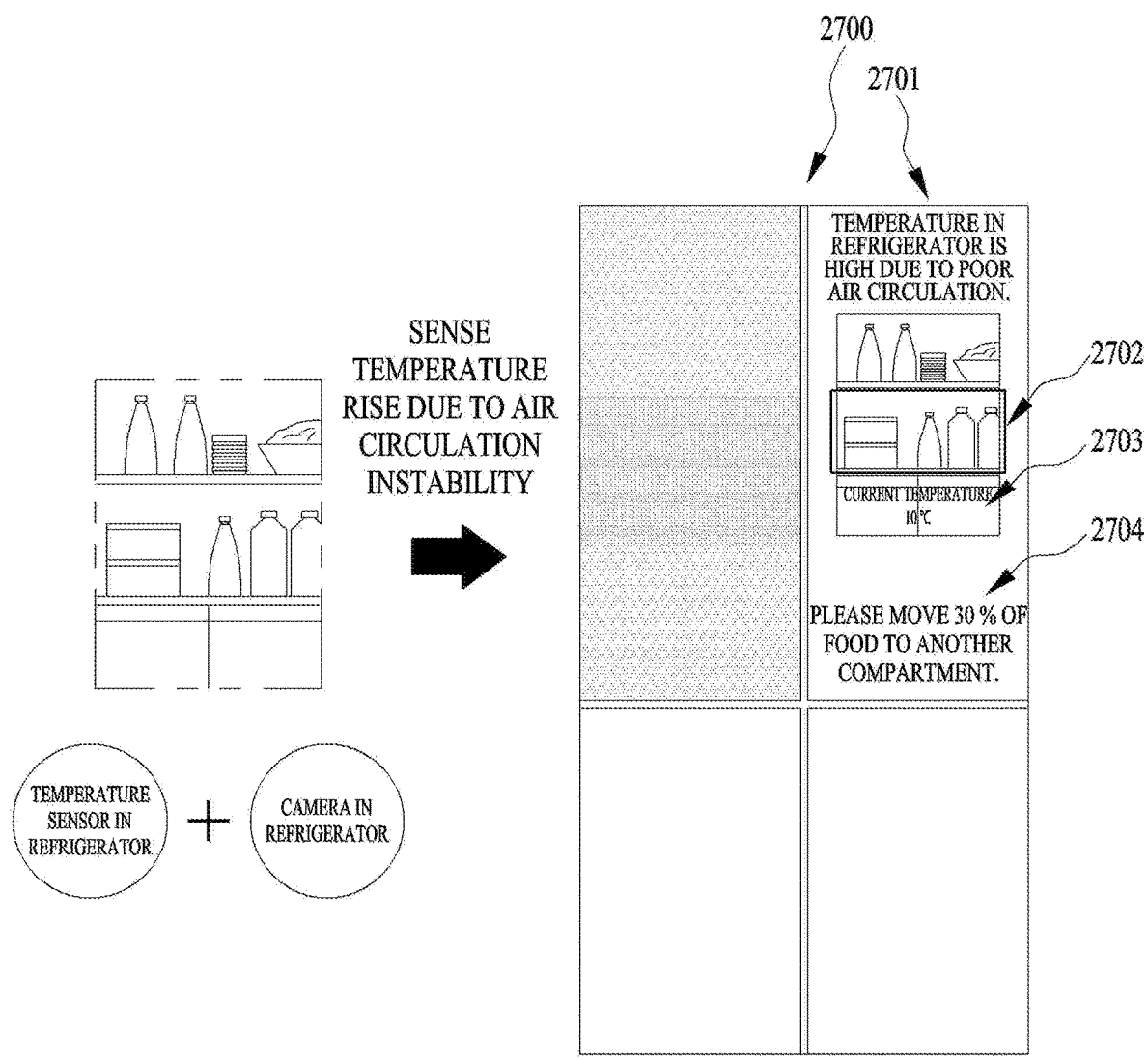

FIGS. 25 to 27 are views for illustrating an embodiment of sensing a temperature change in a refrigerator in a display door of the refrigerator according to an embodiment of the present disclosure.

Referring to FIG. 25, when the hot food with the temperature equal to or higher than the threshold temperature is recognized, a refrigerator 2500 can output a warning screen via a display panel 2501 of the display door. In this regard, the warning screen can contain a warning icon 2502 and a warning text 2503 indicating an abnormal temperature in the refrigerator 2500.

In addition, the refrigerator 2500 can additionally provide a monitoring panel 2504 via the display panel 2501. The monitoring panel 2504 can contain a temperature icon 2504a, an electricity icon 2504b, and a hygiene icon 2504c. In this regard, each icon corresponds to an icon for outputting detailed information.

More specifically, when the user selects the temperature icon 2504a, the refrigerator 2500 can output a current entire temperature monitoring screen of the refrigerator 2500 via the display panel 2501. The temperature monitoring screen can contain a refrigerator temperature adjustment user interface. For example, the user can forcefully lower a temperature of a compartment whose temperature needs to be rapidly lowered after putting the hot food via the temperature adjustment user interface.

In addition, when the user selects the electricity icon 2504b, the refrigerator 2500 can output an electricity monitoring screen for checking a current electricity consumption of the refrigerator 2500 via the display panel 2501. The electricity monitoring screen can allow an electricity consumption of each compartment of the refrigerator 2500 to be checked, and can output a reason for excessive consumption of the electricity of each compartment.

Finally, when the user selects the hygiene icon 2504, the refrigerator 2500 can output a screen of a hygiene status of each compartment resulted from the temperature rise via the display panel 2501. For example, the refrigerator 2500 can output the state of the temperature sensor as described with reference to FIG. 22 via the display panel 2501.

Referring to (a) in FIG. 26, when the hot food with the temperature equal to or higher than the threshold temperature is recognized, a refrigerator 2600 can output a warning screen 2602 via a display panel 2601. In this regard, the warning screen 2602 can contain a warning icon and warning text.

In one embodiment, the warning screen 2602 can contain information on a temperature change of the food contained in the refrigerator 2600.

More specifically, the refrigerator 2600 can retain information about the food contained in the refrigerator 2600 according to the above-described embodiment. In addition, the refrigerator 2600 can sense a change in temperature around the food via a temperature sensor. Therefore, in a case of food sensitive in temperature, the refrigerator 2600 can output information about the temperature change of the food via the warning screen 2602.

In one embodiment, the refrigerator 2600 can output a text "Food is spoiled" for food 1, a text "Eat it within a day" for food 2, and a text "Eat soon" for food 3.

That is, the refrigerator 2600 can inform the user of whether there is a risk of deterioration of the food based on the temperature change in consideration of the information about the food and the temperature change.

Referring to (b) in FIG. 26, the refrigerator 2600 can switch a mode of the display panel 2601 to a transparent mode, a translucent mode, and an opaque mode according to the above-described embodiment. According to one embodiment, in consideration of the information about the food and the temperature change, when the food located in the display door compartment is affected by the temperature change, the refrigerator 2600 can switch the mode of the display panel 2601 to the translucent mode to allow internal food 2602 to be seen by the user, and at the same time, output a text. For example, the refrigerator 2600 can switch the mode of the display panel 2601 to the translucent mode to output the internal food 2602 in the display door via the display panel 2601, and at the same time, output a text "Hot food is raising refrigerator temperature. This food is perishable, so please move it." In this regard, the refrigerator 2600 can switch only a partial region of the display panel 2601 to a transparent region in order to display the internal food 2602. In addition, the refrigerator 2600 can output an arrow indicator or the like via the display panel 2601 to display the internal food 2602.

In addition, the refrigerator 2600 can output a risk of deterioration with respect to a current temperature in connection with food information registered in the database. In addition, in a case of food to be consumed within a day or immediately, the refrigerator 2600 can induce the user to consume the food immediately by outputting a recipe via the display panel 2601. In addition, the refrigerator 2600 can output setting information such as a reheating method or an associated cooking appliance via the display panel 2601 in the case of the food to be consumed within a day or immediately.

In addition, unlike the embodiments in FIGS. 25 and 26, even when the hot food with the temperature equal to or higher than the threshold temperature is not stored in the refrigerator, the temperature in the refrigerator can rise due to air circulation instability.

In this regard, this will be described in detail with reference to FIG. 27.

Referring to FIG. 27, a refrigerator 2700 can sense the air circulation instability via a temperature sensor and a camera inside the refrigerator 2700. In this regard, the air circulation instability can include a case in which the temperature sensor senses the abnormal temperature even though the hot food is not stored in the refrigerator 2700. In addition, the air circulation instability can include a case in which an amount of food stored in a specific compartment inside the refrigerator 2700 exceeds a threshold value.

In one embodiment, when sensing the abnormal temperature via the temperature sensor, the refrigerator 2700 can film the inside of the refrigerator 2700 via an internal camera of the refrigerator 2700. The refrigerator 2700 can determine whether the air circulation is good or bad by analyzing the filmed internal space. Thereafter, the refrigerator 2700 can output the determination result of the air circulation to the user via the LED door and the display door.

In one embodiment, the refrigerator 2700 can output the determination result of the air circulation via a display panel 2701. The determination result of the air circulation can include a warning text, a screen 2702 corresponding to a compartment in which air circulation is unstable, a temperature 2703 of the compartment in which the air circulation is unstable compared to a temperature of an entirety of the refrigerator, and a recommended amount of food 2704 to be moved to another compartment.

More specifically, the refrigerator 2700 can output the screen 2702 filmed via the internal camera via the display panel 2701. In this regard, the screen 2702 can correspond to a screen obtained by filming the compartment in which the air circulation is unstable with the internal camera as the determination result of the air circulation.

Accordingly, the user can recognize, via the screen 2702 being output via the display panel 2701, a fact that a temperature of a compartment currently being output via the screen 2702 is higher than that of another compartment, and the recommended amount of the food 2704 to be moved to another compartment.

In addition, the refrigerator 2700 can output a recipe or information such as a cooking appliance via the display panel 2701 in a case of food that should be consumed in the near future in order to overcome the air circulation instability.

The above-described present disclosure can be implemented as computer-readable code on a computer-readable medium in which a program is recorded. The computer-readable medium can be any type of recording device in which data that can be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer can include the controller 180 of the terminal. It will be apparent to those skilled in the art that various modifications and variations can be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

What is claimed is:

1. A refrigerator comprising:
    a cabinet for defining a space;
    a first display door for opening and closing the space, the first display door including a display panel configured to output content and a front camera;
    a second door for opening and closing the space; and
    a controller configured to control the display panel of the first display door and the light sources in the second door,
    wherein the second door includes:
        a front plate;
        a light guide plate configured to guide light to the front plate; and
        the light sources configured to irradiate color light to the light guide plate and when the light sources are turned on, the front plate is configured to emit light in a first color, and
    wherein the controller is further configured to:
        recognize a face of a first user via the front camera;
        receive a name corresponding to the first face via the display panel;
        map the face to the name, and store a mapping of the face and the name in a database;
        receive a memo via the display panel from a second user, the memo containing the name corresponding to the first user and information about a first food, and
        in response to recognizing the face corresponding to the first user via the front camera after giving the memo, change a color of a partial region of one of the first display door and the second door corresponding to a location of the first food.

2. The refrigerator of claim 1, further comprising:
    a third door and a fourth door for opening and closing the space,
    wherein each of the third and fourth doors include:
        a front plate;
        a light guide plate configured to guide light to the front plate; and
        light sources configured to irradiate light to the light guide plate and when the light sources are turned on, the front plate is configured to emit light in a first color.

3. The refrigerator of claim 1, wherein the light sources included in the second door are arranged in one of a lower edge-type structure, a side edge-type structure, a lower and side edge-type structure, and a direct-type structure.

4. The refrigerator of claim 1, wherein the light sources are LEDs configured to exhibit red, green and blue colors.

5. The refrigerator of claim 1,
wherein the controller is further configured to:
in response to a user approaching the first display door, activate the front camera;
capture an image of food via the front camera; and
store information about the food in the database based on the image, the information including a name of the food and an expiration date of the food.

6. The refrigerator of claim 1, wherein the second door includes a camera,
wherein the controller is configured to:
capture an image of food via the camera; and
store information about the food in the database, the information including a name of the food and an expiration date of the food.

7. The refrigerator of claim 1, wherein the controller is further configured to:
receive information about food from a user via the display panel; and
store the information about the food in the database, wherein the information including a name of the food and an expiration date of the food.

8. The refrigerator of claim 1, further comprising an internal camera for filming an interior of the refrigerator,
wherein the controller is further configured to:
determine a location of food via the internal camera; and
store the location of the food in the database together with information about the food, the information including a name of the food and an expiration date of the food.

9. The refrigerator of claim 1, wherein the controller is further configured to output at least one of an expiration date of the food, a location of the food, and a storage amount of the food stored in the space on the display panel.

10. The refrigerator of claim 9, wherein the controller is further configured to:
output the expiration date of the food with an expiration date indicator;
output the expiration date indicator in a second color when a period smaller than or equal to a first period is remaining until the expiration date of the food; and
output the expiration date indicator in a third color when the food has passed the expiration date.

11. The refrigerator of claim 9, wherein the controller is further configured to change a color of the second door based on the expiration date of the food.

12. The refrigerator of claim 11, wherein the controller is further configured to change a color of a partial region of the second door based on the location of the food.

13. The refrigerator of claim 12, wherein the controller is further configured to output a flickering indicator on the second door at an area corresponding to the location of the food using a light source located in the partial region.

14. The refrigerator of claim 9, further comprising a communication interface for communicating with a user terminal,
wherein the controller is further configured to:
in response to receiving a request for a recommended location of a second food from the user terminal, change a color of one of the first display door, and the second door corresponding to the recommended location of the second food.

15. The refrigerator of claim 14, wherein the controller is further configured to output a guide indicator indicating a recommended location of a third food when a location of the third food stored in the space does not match the recommended location of the third food.

16. The refrigerator of claim 14, wherein the recommended location is determined based on at least one of a temperature of the space, a degree of congestion of the space, a characteristic of the second food, and a freshness degree of the second food.

17. The refrigerator of claim 14, wherein the communication interface is further configured to receive information from a server,
wherein the controller is further configured to:
update information displayed on the display panel when a third fourth food stored in the space is withdrawn; and
display a pop-up window on the display panel when food related to the fourth food is not in the space, the pop-up window including the information received from the server.

18. The refrigerator of claim 9, further comprising at least one temperature sensor for sensing a temperature of the space,
wherein the controller is further configured to change a color of at least one of the first display door and the second door to correspond to the temperature when the temperature sensed by the temperature sensor is greater than or equal to a first temperature.

19. The refrigerator of claim 18, wherein the controller is further configured to output a warning screen via the display panel when the temperature sensed by the temperature sensor is greater than or equal to the first temperature.

20. The refrigerator of claim 1, wherein the display panel is configured to operate in one of a transparent mode, a translucent mode, and an opaque mode under the control of the controller.

21. A method for controlling a refrigerator including a cabinet for defining a space, a first display door for opening and closing the space, the first display door having a display panel for outputting content and a front camera, a second door for opening and closing the space and having light sources, and a controller configured to control the display panel and the light sources, the method comprising:
irradiating, by the light sources, light to a light guide plate included in the second door;
transmitting the light irradiated to the light guide plate through a front plate included in the second door; and
emitting, by the front plate in the second door, light of a first color when the light sources are turned on,
wherein the method further comprises:
recognizing a face of a first user via the front camera;
receiving a name corresponding to the first face via the display panel;
mapping the face to the name, and store a mapping of the face and the name in a database,
receiving a memo via the display panel from a second user, the memo containing the name corresponding to the first user and information about a first food; and
in response to recognizing the face corresponding to the first user via the front camera after receiving the memo, changing a color of a partial region of one of the first display door and the second door corresponding to a location of the first food.

* * * * *